US012459249B2

(12) United States Patent
Shingu et al.

(10) Patent No.: US 12,459,249 B2
(45) Date of Patent: Nov. 4, 2025

(54) LIQUID EJECTING APPARATUS

(71) Applicant: SEIKO EPSON CORPORATION, Tokyo (JP)

(72) Inventors: Yuji Shingu, Shiojiri (JP); Jun Sato, Shiojiri (JP); Masaya Harayama, Suwa (JP); Hiromitsu Orii, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 179 days.

(21) Appl. No.: 18/351,083

(22) Filed: Jul. 12, 2023

(65) Prior Publication Data

US 2024/0017545 A1 Jan. 18, 2024

(30) Foreign Application Priority Data

Jul. 14, 2022 (JP) ................................ 2022-112968

(51) Int. Cl.
*B41J 2/045* (2006.01)
*B41J 2/165* (2006.01)

(52) U.S. Cl.
CPC ......... *B41J 2/0452* (2013.01); *B41J 2/04551* (2013.01); *B41J 2/04588* (2013.01); *B41J 2/16508* (2013.01); *B41J 2/04541* (2013.01); *B41J 2/0455* (2013.01)

(58) Field of Classification Search
CPC .. B41J 2/0452; B41J 2/04551; B41J 2/04588; B41J 2/04541; B41J 2/0455
See application file for complete search history.

(56) References Cited

U.S. PATENT DOCUMENTS

2014/0340699 A1* 11/2014 Nakano .................... B41J 29/13 358/1.13
2019/0384543 A1* 12/2019 Mickan ................. G06F 3/1285
2020/0164638 A1 5/2020 Takagi
2021/0023842 A1 1/2021 Watanabe

FOREIGN PATENT DOCUMENTS

JP 2007-160602 A 6/2007
JP 2020-082479 A 6/2020
JP 2021-020343 A 2/2021

* cited by examiner

*Primary Examiner* — Geoffrey S Mruk
(74) *Attorney, Agent, or Firm* — WORKMAN NYDEGGER

(57) ABSTRACT

A liquid ejecting apparatus is configured to transition to a first mode in which less electric power is consumed per unit period than in the printing operation and a second mode in which less electric power is consumed per unit period than in the first mode. The second mode is started at the end of a predetermined period of time following completion of the printing operation. The first mode is started after the printing operation is completed and before the second mode is started. The period of time taken for the liquid ejecting apparatus to return to the printing operation from the first mode is shorter than the period of time taken for the liquid ejecting apparatus to return to the printing operation from the second mode.

7 Claims, 11 Drawing Sheets

LIQUID EJECTING APPARATUS

The present application is based on, and claims priority from JP Application Serial Number 2022-112968, filed Jul. 14, 2022, the disclosure of which is hereby incorporated by reference herein in its entirety.

BACKGROUND

1. Technical Field

The present disclosure relates to a liquid ejecting apparatus.

2. Related Art

As represented by an ink jet printer, a liquid ejecting apparatus that executes a printing operation to eject liquid such as ink when receiving a print instruction from a host computer, such as a personal computer or a digital camera, is known in the related art. For example, JP-A-2007-160602 discloses a liquid ejecting apparatus that executes a printing operation and transitions to a power-saving mode, which supplies electric power only to necessary sections and stops supplying electric power to the other sections, when the standby state following completion of the printing operation continues for a predetermined period of time.

According to the aforementioned technique, the liquid ejecting apparatus is able to restart the printing operation immediately upon receiving a print instruction during the standby state. However, the liquid ejecting apparatus wastes electric power in a certain period of time between when the liquid ejecting apparatus completes the printing operation and when the liquid ejecting apparatus transitions to the power-saving mode.

SUMMARY

The present disclosure is a liquid ejecting apparatus configured to execute a printing operation to eject liquid from a nozzle toward a medium. The liquid ejecting apparatus is configured to transition to: a first mode in which less electric power is consumed per unit period than in the printing operation; and a second mode in which less electric power is consumed per unit period than in the first mode. The second mode is started at the end of a predetermined period of time following completion of the printing operation, and the first mode is started after the printing operation is completed and before the second mode is started. A period of time taken for the liquid ejecting apparatus to return to the printing operation from the first mode is shorter than a period of time taken for the liquid ejecting apparatus to return to the printing operation from the second mode.

DESCRIPTION OF EXEMPLARY EMBODIMENTS

Hereinafter, forms for carrying out the present disclosure are described with reference to the drawings. In each drawing, the dimensions and scale of each section are properly different from the actual ones. The embodiments described below are preferable specific examples of the present disclosure and are therefore given various technically-preferable restrictions. The scope of the present disclosure is not limited to these forms unless the following description includes particular description to limit the present disclosure.

The following description properly uses an X-axis, a Y-axis, and a Z-axis, which intersect with one another, for convenience. A direction along the X-axis is an X1 direction, and the opposite direction to the X1 direction is an X2 direction. In a similar manner, opposite directions along the Y-axis are a Y1 direction and a Y2 direction, and opposite directions along the Z-axis are a Z1 direction and a Z2 direction.

Typically, the Z-axis is a vertical axis, and the Z2 direction corresponds to the vertically down direction. In other words, the Z2 direction is the direction of gravitational force. The Z-axis does not need to be vertical and may be inclined with respect to the vertical axis. The X-, Y-, and Z-axes are typically at right angles to one another but are not limited to this configuration. For example, the X-, Y-, and Z-axes intersect at angles of not less than 80 degrees and not greater than 100 degrees.

1. First Embodiment

1-1. Outline of Liquid Ejecting Apparatus 100

Figure 1:
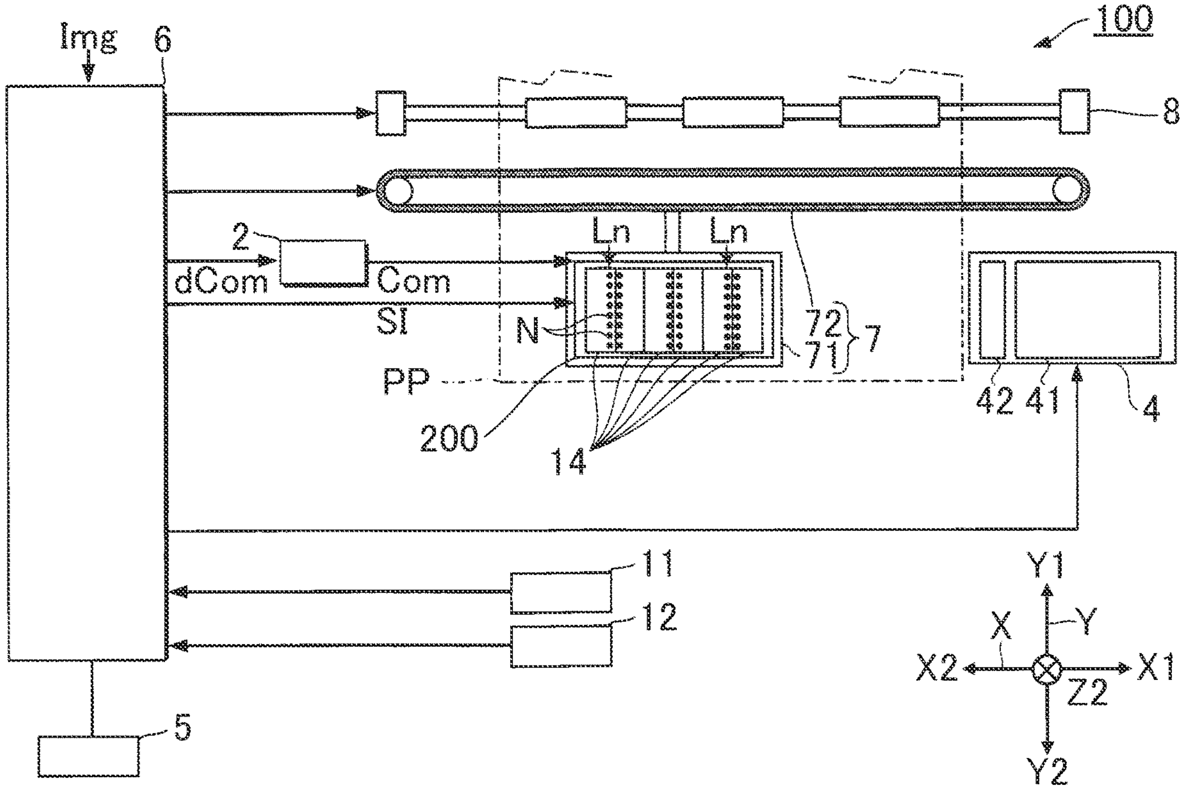
FIG. 1 is a schematic diagram illustrating a configuration example of a liquid ejecting apparatus.

FIG. 1 is a schematic diagram illustrating a configuration example of a liquid ejecting apparatus 100. The liquid ejecting apparatus 100 is an ink jet-type printing apparatus that ejects ink as an example of liquid, in the form of liquid droplets onto a medium PP. The medium PP, which is typically a sheet of paper, can be any printing material, such as resin film or fabric.

As illustrated in FIG. 1, the liquid ejecting apparatus 100 includes a driving signal generation circuit 2, liquid containers 14, a memory unit 5, a controller 6, a transport mechanism 8, a movement mechanism 7, a liquid ejecting head 200, a maintenance mechanism 4, a mechanical contact sensor 11, and a photosensor 12.

The liquid containers 14 are containers to reserve ink. Specific forms of the liquid containers 14 are a cartridge detachable from the liquid ejecting apparatus 100, a bag-shaped ink pack made of flexible film, or an ink tank that can be refilled with ink, for example. The types of ink reserved in the liquid containers 14 are optional. In the description of the first embodiment, the liquid containers 14 are cartridges detachable from the liquid ejecting apparatus 100 and the liquid ejecting apparatus 100 includes six liquid containers 14.

The memory unit 5 includes one or plural storage circuits, such as a semiconductor memory. The semiconductor memory is a non-volatile memory, such as a flash memory, for example. The memory unit 5 may include a volatile memory such as a RAM. "RAM" is an abbreviation for "random access memory". The memory unit 5 stores various programs and various kinds of data.

The controller 6 is one or plural processing circuits, such as a CPU, an SoC, an ASIC, or an FPGA, for example. "CPU" is an abbreviation for "central processing unit". "SoC" is an abbreviation for "system-on-a-chip". "ASIC" is an abbreviation for "application specific integrated circuit". "FPGA" is an abbreviation for "field programmable gate array". The controller 6 executes the programs stored in the memory unit 5 and properly uses the data stored in the memory unit 5 to implement various controls.

The transport mechanism 8 transports the medium PP in the Y2 direction under control of the controller 6. In the example illustrated in FIG. 1, the transport mechanism 8 includes a transport roller that is elongated along the X-axis and a motor to rotate the transport roller. The transport mechanism 8 is not limited to the configuration using the transport roller and may be configured to use a drum or an endless belt that transports the medium PP that clings to the outer circumferential surface thereof by electrostatic force or the like, for example.

The movement mechanism 7 reciprocates the liquid ejecting head 200 in the X1 and X2 directions under control of the controller 6. In the first embodiment, the X1 and X2 directions are the main scanning direction, and the Y2 direction is the sub-scanning direction. The liquid ejecting apparatus 100 according to the first embodiment is thus a serial-type liquid ejecting apparatus that reciprocates the liquid ejecting head 200 along the X-axis. As illustrated in FIG. 1, the movement mechanism 7 includes a carriage 71, an endless belt 72, and a not-illustrated carriage motor as a driving source to reciprocate the carriage 71. The carriage 71 accommodates the liquid ejecting head 200 and is fixed to the endless belt 72.

The liquid ejecting head 200, under control of the controller 6, ejects ink supplied from the liquid containers 14, toward the medium PP in the Z2 direction through plural nozzles N. The plural nozzles N constitute nozzle lines Ln. In the example of the first embodiment, each nozzle line Ln includes M nozzles N.

The controller 6 controls an ejection operation of the liquid ejecting head 200. The ejection operation is to drive piezoelectric elements 243 for ejecting liquid from the nozzles N. Specifically, the controller 6 generates a specifying signal SI to control the liquid ejecting head 200, a waveform specifying signal dCom to control the driving signal generation circuit 2, a signal to control the transport mechanism 8, a signal to control the movement mechanism 7, and other signals.

The waveform specifying signal dCom is a digital signal that defines the waveform of a driving signal Com. The driving signal Com is an analogue signal to drive each piezoelectric element 243, which is described later in FIG. 4. The driving signal generation circuit 2 generates the driving signal Com, which has a waveform defined by the waveform specifying signal dCom. The piezoelectric element 243 is an example of "a driving element".

The specifying signal SI is a digital signal to specify the type of operation of the piezoelectric elements 243. Specifically, the specifying signal SI specifies the type of operation of the piezoelectric elements 243 by specifying whether to supply the driving signal Com to each piezoelectric element 243. Herein, "specifying the type of operation of the piezoelectric elements 243" includes specifying whether to drive each piezoelectric element 243 and specifying whether to eject ink from the corresponding nozzle N when each piezoelectric element 243 is driven, for example.

When receiving a print instruction from a host computer, such as a personal computer or a digital camera, the controller 6 first stores in the memory unit 5, print data Img included in the print instruction. Next, based on various kinds of data, such as the print data Img stored in the memory unit 5, the controller 6 generates various control signals, including the specifying signal SI, the waveform specifying signal dCom, the signal to control the transport mechanism 8, and the signal to control the movement mechanism 7. The controller 6, based on the various control signals and the various kinds of data stored in a memory circuit of the controller 6, controls the transport mechanism 8 and movement mechanism 7 so as to change the relative position of the medium PP to the liquid ejecting head 200 while controlling the liquid ejecting head 200 so as to drive the piezoelectric elements 243. The controller 6 thereby adjusts whether to eject ink from each nozzle N, the amount of ink to be ejected, and the timing of ink ejection, and the like for controlling execution of a printing operation to form an image corresponding to the print data Img on the medium PP. Furthermore, the controller 6 controls execution of micro-vibration operation to vibrate ink within the nozzle N by a certain degree not ejecting the ink from the nozzle N. The micro-vibration operation includes two types of operation: an in-printing micro-vibration operation performed in an execution period of the printing operation and an out-of-printing micro-vibration operation performed in a period of time different from the execution period of the printing operation.

The maintenance mechanism 4 is a mechanism used in a maintenance operation to maintain the liquid ejecting head 200. The maintenance operation includes a flushing operation, a cleaning operation, and a wiping operation, for example. The flushing operation is an operation to drive the later-described piezoelectric elements 243 in such a way as to forcibly eject through the plural nozzles N, ink not directly contributing to formation of an image. For example, in the flushing operation, ink is ejected to a not-illustrated flushing box included in the maintenance mechanism 4. The cleaning operation is a pressure cleaning operation or a suction cleaning operation described in detail later. The pressure cleaning operation is a process to forcibly discharge ink within the liquid ejecting head 200 through the plural nozzles N by pressurizing ink upstream of later-described pressure chambers 275 of the liquid ejecting head 200 with a not-illustrated pressure pump. In the middle of a supply channel allowing the liquid containers 14 and the nozzles N to communicate with each other, a valve to open and close the supply channel may be provided. The wiping operation is a process to wipe the surface provided with the nozzles N, with a wiping member 42. The wiping member 42 is made of an elastic material, such as rubber, or a fiber material, such as woven or non-woven fabric. The wiping operation is performed in order to remove stains, such as ink sticking to the surface provided with the nozzles N. The wiping operation may be performed following discharge of ink or may be performed independently of discharge of ink.

Figure 2:
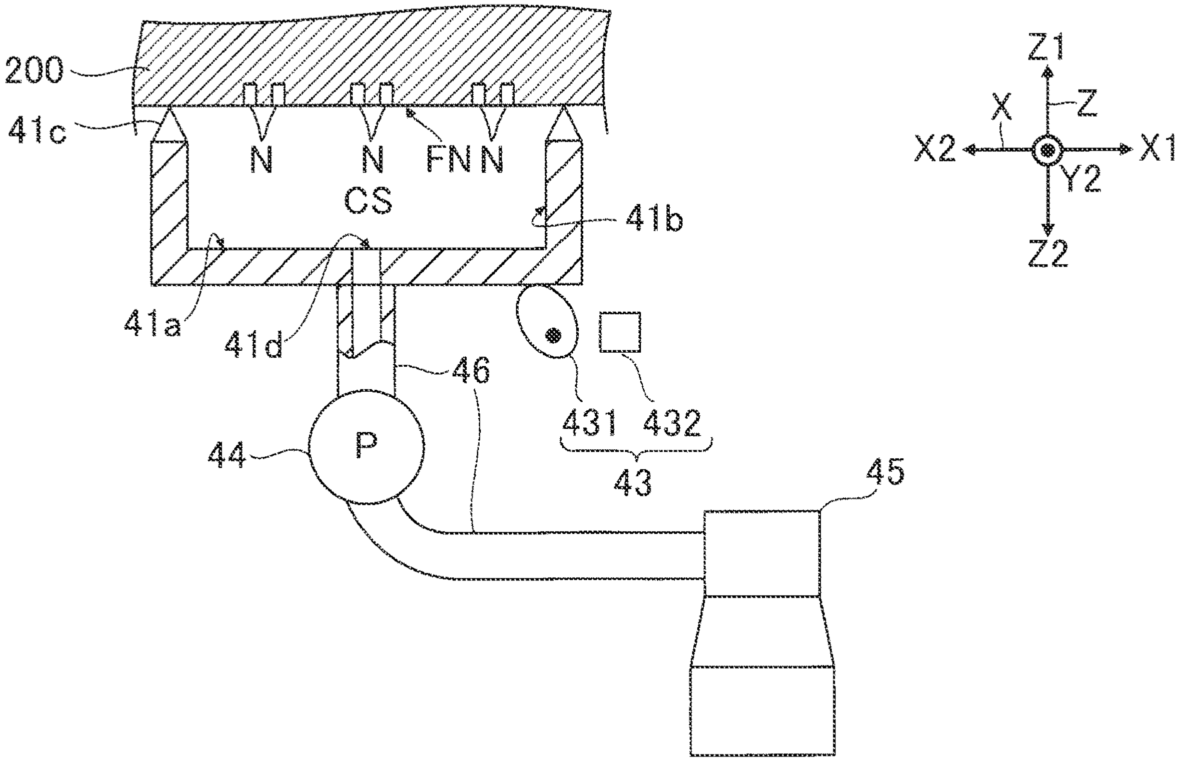
FIG. 2 is a diagram for explaining a maintenance mechanism.
Figure 3:
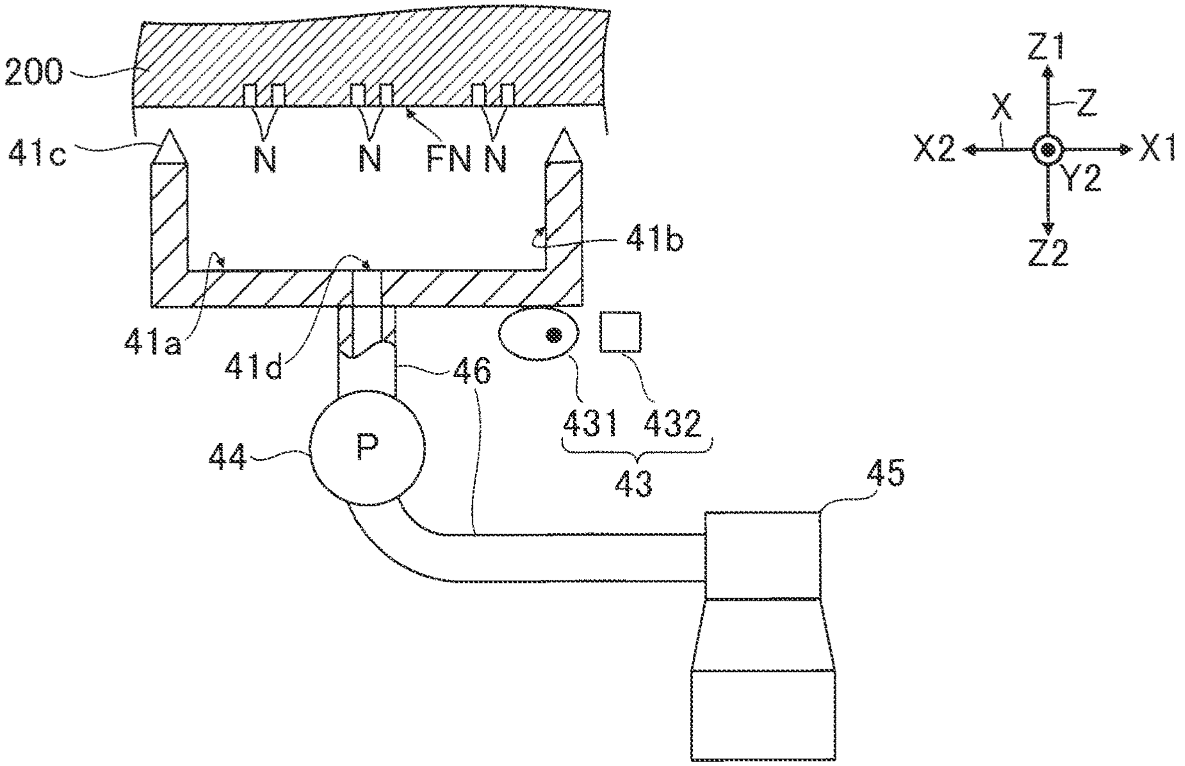
FIG. 3 is a diagram for explaining the maintenance mechanism.

FIGS. 2 and 3 are diagrams for explaining the maintenance mechanism 4. The maintenance mechanism 4 includes a cap 41, an elevation mechanism 43, a suction pump 44, a waste liquid tank 45, a waste liquid channel 46, the wiping member 42, and a mechanism to move the wiping member 42. The cap 41 seals the plural nozzles N at the cleaning operation. The elevation mechanism 43 moves the cap 41 along the Z-axis. The waste liquid channel 46 allows the cap 41 and the waste liquid tank 45 to communicate with each other. In addition to these components, the maintenance mechanism 4 may include the aforementioned pressure pump or valve or the like. The maintenance mechanism 4 further includes a not-illustrated flushing box that receives ink ejected from the nozzles N by the flushing operation. The flushing box does not need to be provided, and the cap 41 may serve as the flushing box. FIGS. 2 and 3 illustrate an aspect where the cap 41 serves as the flushing box.

The cap 41 includes a bottom wall 41*a* and a side wall 41*b*. In the bottom wall 41*a*, a suction hole 41*d* coupled to the waste liquid channel 46 is formed. The side wall 41*b* extends from the outer edge portion of the bottom wall 41*a* in the Z1 direction. The cap 41 thereby has a recess defined by the bottom wall 41*a* and side wall 41*b*. At the top end of the side wall 41*b* in the Z1 direction, a flexible and annular seal member 41*c* is provided. The seal member 41*c* comes into contact with an ejection surface FN, which is provided with the nozzles N, so that the cap 41 forms a closed space CS, to which the plural nozzles N are opened. FIGS. 2 and 3 illustrate cross sections around some nozzles N viewed from the Y2 direction to the Y1 direction when the liquid ejecting head 200 faces the maintenance mechanism 4. For simplified illustration, FIGS. 2 and 3 illustrate only the nozzles N and ejection surface FN in the liquid ejecting head 200 and only the cross section of the cap 41 and the cross section of the waste liquid channel 46 around the cap 41 in the maintenance mechanism 4 and do not illustrate cross sections of the other elements of the maintenance mechanism 4. In FIG. 2, the seal member 41*c* is in contact with the ejection surface FN to form the closed space CS. In FIG. 3, the seal member 41*c* is separated from the ejection surface FN and does not form the closed space CS. The plural nozzles N are therefore opened to the atmosphere. In the following description, the state where the seal member 41*c* is in contact with the ejection surface FN to form the closed space CS as illustrated in FIG. 2 is sometimes referred to as "a capping state".

The elevation mechanism 43 includes an eccentric cam 431 and a driving mechanism 432 such as a motor, for example. The driving mechanism 432 rotates the eccentric cam 431. The eccentric cam 431 is elliptical along X-Z plane and has a rotation axis AY. The rotation axis AY is away from the center of the ellipse. The eccentric cam 431 is in contact with the surface of the cap 41 that faces in the Z2 direction. By the driving mechanism 432 rotating the eccentric cam 431, the cap 41 moves in a direction along the Z-axis. The elevation mechanism 43 enables execution of the capping operation to change the relative position of the cap 41 to the ejection surface FN so that the closed space CS be formed. In the first embodiment, the relative position of the cap 41 to the ejection surface FN is changed by moving the cap 41. However, the relative position of the cap 41 to the ejection surface FN may be changed by moving the ejection surface FN. The maintenance operation maintains the good condition of ink within the liquid ejecting head 200.

The suction cleaning operation is an operation to forcibly discharge ink within the liquid ejecting head 200 through the plural nozzles N, by suction with the suction pump 44 downstream of the plural nozzles N. As illustrated in FIGS. 2 and 3, the suction pump 44 is provided in the middle of the waste liquid channel 46. The suction cleaning operation is executed in the capping state, that is, in the state where the closed space CS is formed. The suction pump 44 produces negative pressure, which is lower than the atmospheric pressure, within the closed space CS. When negative pressure is produced in the closed space CS, the negative pressure acts on the plural nozzles N, so that ink is discharged from the plural nozzles N. The ink discharged from the plural nozzles N passes through the waste liquid channel 46 to be collected in the waste liquid tank 45.

The liquid ejecting apparatus 100 includes a not-illustrated housing configured to accommodate the liquid ejecting head 200, maintenance mechanism 4, controller 6, movement mechanism 7, transport mechanism 8, and the like. The housing is provided with an opening allowing access to the liquid containers 14, which are arranged inside the housing, from the outside of the housing and a not-illustrated opening/closing cover that can open and close the opening.

The mechanical contact sensor 11 is a sensor to detect whether the aforementioned opening/closing cover is opened. When the opening/closing cover of the liquid ejecting apparatus 100 is opened, the liquid containers 14 and the liquid ejecting head 200 are exposed. By opening the opening/closing cover of the liquid ejecting apparatus 100, the user is able to, for example, replace the liquid containers 14 and the liquid ejecting head 200. The mechanical contact sensor 11 is used to monitor whether the opening/closing cover of the liquid ejecting apparatus 100 is accidentally opened by the user during the printing operation, for example. The mechanical contact sensor 11 outputs to the controller 6, information indicating whether the opening/closing cover is opened. When the mechanical contact sensor 11 detects that the opening/closing cover is opened during the printing operation, the controller 6 immediately stops the movement mechanism 7, the transport mechanism 8, the liquid ejecting head 200, or the like to halt the printing operation. The mechanical contact sensor 11 thus suppresses touching of the liquid containers 14 or liquid ejecting head 200 by the user at improper times.

The photosensor 12 is a sensor to detect the position of the carriage 71 and the position of the medium PP. The photosensor 12 outputs to the controller 6, information concerning the position of the carriage 71 in the main scanning direction and information concerning the position of the medium PP.

1-2. Configuration of Liquid Ejecting Head 200

Figure 4:
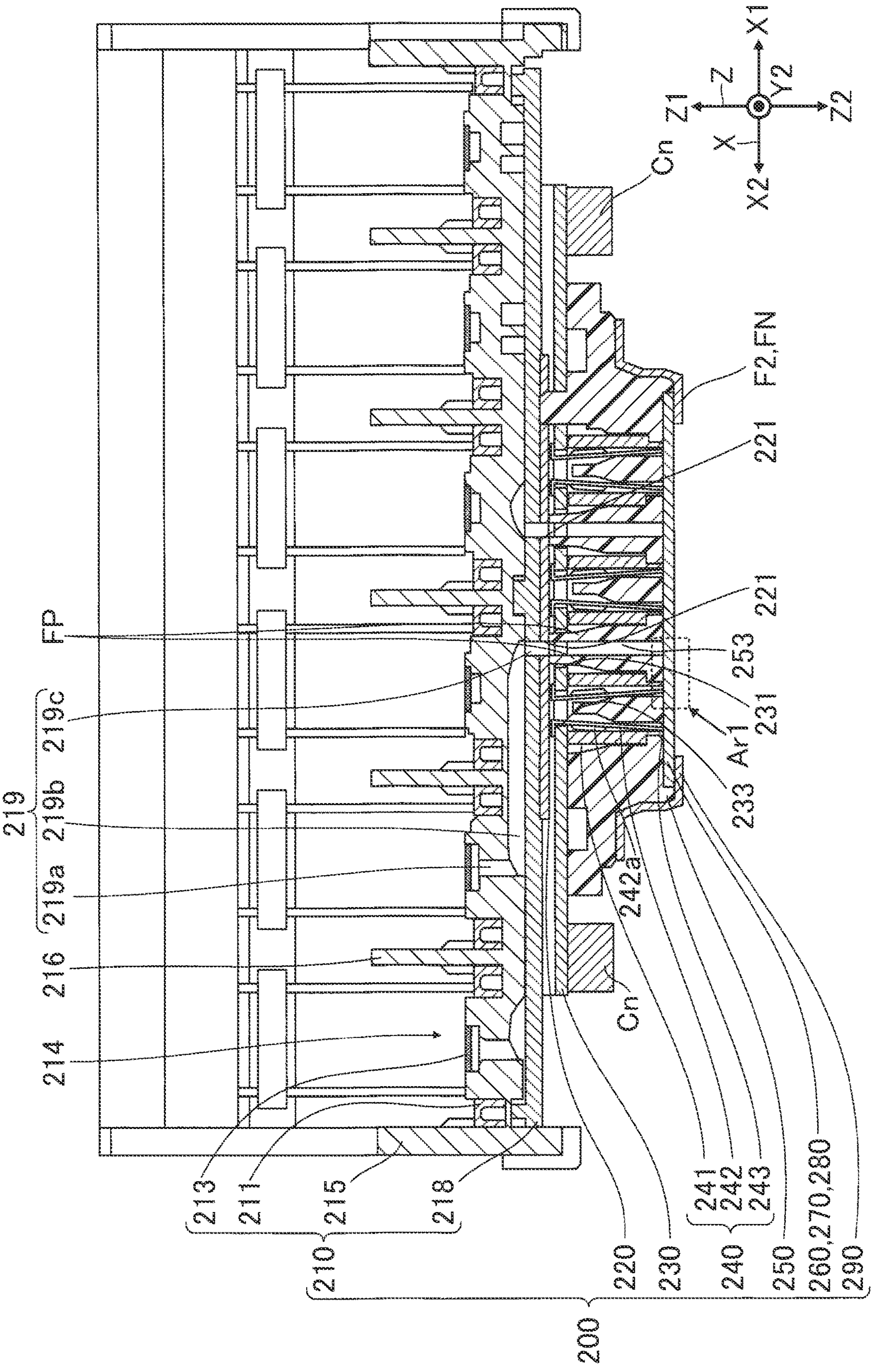
FIG. 4 is a sectional view of a liquid ejecting head taken along an X-axis.
Figure 5:
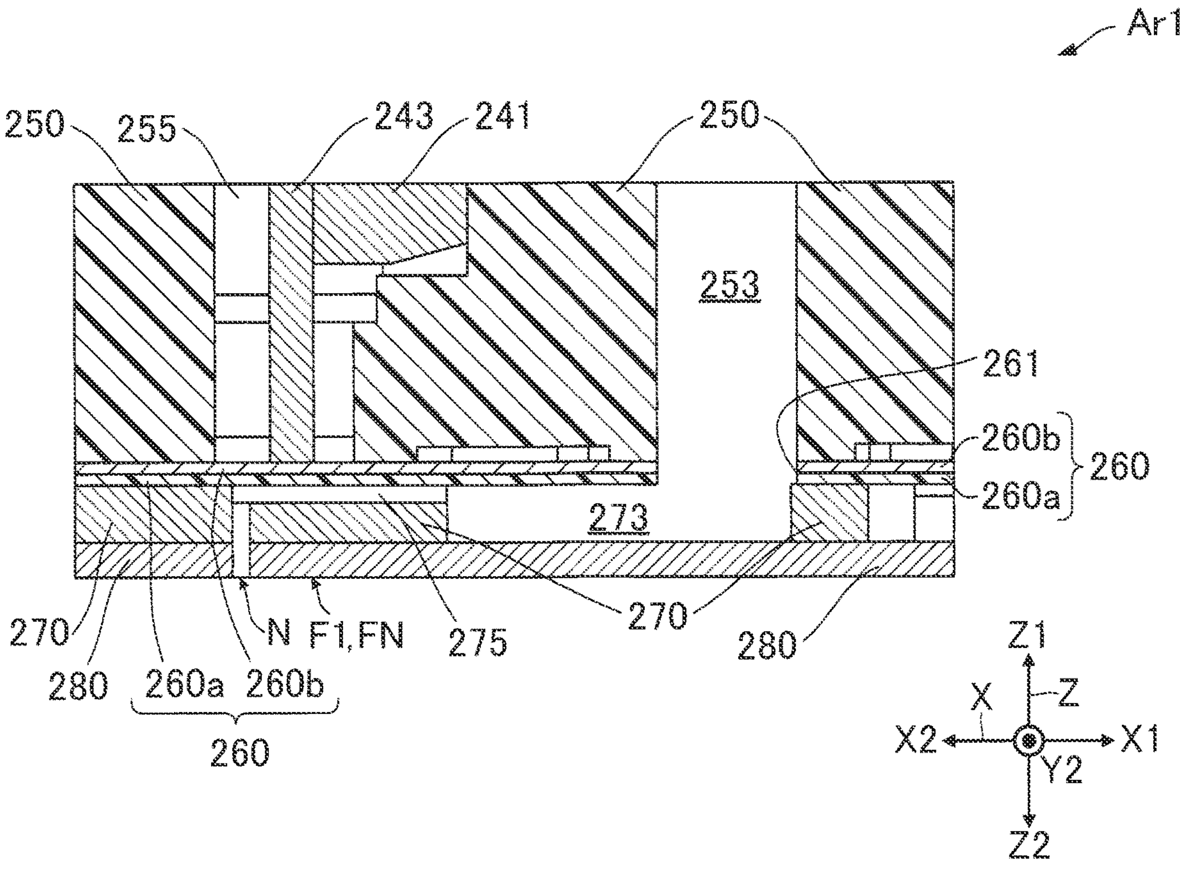
FIG. 5 is an enlarged diagram of an area illustrated in FIG. 4.

FIG. 4 is a sectional view of the liquid ejecting head 200 taken along the X-axis. FIG. 5 is an enlarged view of an area Ar1 illustrated in FIG. 4. The liquid ejecting head 200 includes a holder 210, a seal member 220, a circuit substrate 230, plural actuator units 240, a case 250, a vibration plate 260, a pressure chamber substrate 270, a nozzle plate 280, and a cover 290, which are sequentially arranged in the Z2 direction. In the liquid ejecting head 200, these constituent members are stacked and are fastened with a not-illustrated screw or bonded with an adhesive. FIG. 4 illustrates the vibration plate 260, the pressure chamber substrate 270, and the nozzle plate 280 as a single rectangle for suppressing complicated illustration.

The holder 210 holds the liquid containers 14 in cooperation with the carriage 71 and causes ink supplied from the liquid containers 14 to flow into the case 250 through channels 219, which are formed within the holder 210. The holder 210 includes a body 215, seals 211, filters 213, and a channel plate 218.

The body 215 includes mounting sections 214, to which the respective liquid containers 14 are mounted, and channels 219*a*. Each channel 219*a* constitutes part of the corresponding channel 219. Each channel 219 is composed of the channel 219*a*, a channel 219*b*, and a channel 219*c*. Each liquid container 14 is mounted in the corresponding mounting section 214, and a not-illustrated hook portion provided for the liquid container 14 is engaged with a not-illustrated engagement hole provided for the mounting section 214. The liquid container 14 is thereby fixed to the holder 210. The six mounting sections 214 are arranged along the X-axis. The plural mounting sections 214 are separated from each other by walls 216, which are extended in parallel to the Y-axis. Each channel 219*a* is defined by a cylindrical member protruding in the Z2 direction. Each seal 211 is an annular plate member and includes a through-hole passing along the Z-axis. In the surface of the body 215 in the Z2 direction, a not-illustrated groove defining the later-described channel 219*b* is provided.

The filters 213 removes air bubbles or foreign matter contained in ink supplied from the respective liquid containers 14. The channel plate 218 is a plate member elongated along the X-axis. The channel plate 218 includes a groove that defines the channel 219*b* constituting part of the channel 219 and a through-hole that defines the channel 219*c* constituting part of the channel 219. The channel 219*b* is formed by aligning the groove extending along the X-axis in the surface of the channel plate 218 that faces in the Z1 direction with the groove extending along the X-axis in the surface of the body 215 that faces in the Z2 direction, followed by sealing. One end of the channel 219*b* communicates with the channel 219*a*, and the other end communicates with the channel 219*c*. The channel 219*c* is a through-hole passing through the channel plate 218 along the Z-axis at the position where the other end of the channel 219*b* is located.

As described above, the channel 219*a* causes ink supplied from the liquid container 14 to flow into the channel 219*b*, and the channel 219*b* causes the ink from the channel 219*a* to flow into the channel 219*c*. The channel 219*c* causes the ink from the channel 219*b* to flow into a channel 253, which is formed in the case 250, through an ink inlet 221 of the later-described seal member 220.

The seal member 220 is a substantially rectangular plate member that is elongated along the X-axis and is made of an elastic material, such as elastomer. The seal member 220 includes the ink inlet 221. The ink inlet 221 is a through-hole passing through the seal member 220 along the Z-axis. The ink inlet 221 allows the channel 219 of the body 215 and the channel 253, illustrated in FIG. 5, of a channel pipe FP to communicate with each other and causes ink supplied from the liquid container 14 to flow into the case 250. When the constituent members of the liquid ejecting head 200 are stacked and fastened, the seal member 220 is sandwiched between the holder 210 and the channel pipe FP of the case 250 with a predetermined pressure to provide a liquid-tight seal between the channel 219 of the holder 210 and the channel 253 of the channel pipe FP.

The circuit substrate 230 is a substantially rectangular plate member that is elongated along the X-axis. As illustrated in FIG. 4, the circuit substrate 230 is located between the holder 210 and the case 250 and is positioned adjacent to the seal member 220 in the Z2 direction. The circuit substrate 230 is fixed with an adhesive to the surface of the case 250 that faces in the Z1 direction, for example. The circuit substrate 230 is a printed substrate in which circuit elements, wires, and other components to drive the later-described piezoelectric elements 243, that are included in the actuator units 240, are integrated. The circuit substrate 230 is provided with a not-illustrated circuit element, a not-illustrated connection terminal, through-holes 231, openings 233, and connectors Cn.

The through-holes 231 are through-holes passing through the circuit substrate 230 along the Z-axis. The through-holes 231 are provided at such positions as to overlap the respective ink inlets 221 of the seal member 220 as seen in the Z2 direction and are provided at such positions as to overlap the later-described channel pipes FP, which are included in the case 250.

The openings 233 are through-holes that pass through the circuit substrate 230 along the Z-axis and are each provided in parallel to the Y-axis. The plural openings 233 are arranged side by side along the X-axis. In each opening 233, a COF substrate 242 of the corresponding actuator unit 240 is inserted. The top portion of the COF substrate 242 in the Z1 direction that is protruded from the opening 233 in the Z1 direction is bent in the X1 or X2 direction to be coupled to a connection terminal provided for the circuit substrate 230.

The connectors Cn are provided on the surface of the circuit substrate 230 that faces in the Z2 direction, at respective ends of the X-axis. The connectors Cn are coupled to not-illustrated cables, such as flexible flat cables. The circuit substrate 230 is coupled to the controller 6 through the connectors Cn and cables.

Each actuator unit 240 includes the COF substrate 242, a fixed plate 241, and one of the piezoelectric elements 243. "COF" is an abbreviation for "chip on film". The COF substrate 242 is provided with a driving circuit 242*a* to drive the piezoelectric element 243. The end of the COF substrate 242 in the Z2 direction is coupled to the piezoelectric element 243. The end of the COF substrate 242 in the Z1 direction is inserted in the opening 233 of the circuit substrate 230 to be coupled to a connection terminal provided for the circuit substrate 230. The piezoelectric element 243 constitutes a piezoelectric element as a passive component using the piezoelectric effect. The piezoelectric element 243 is driven according to the driving signal Com from the driving signal generation circuit 2. The fixed plate 241 is fixed to the wall surface of the case 250 that defines a later-described accommodation space 255. The piezoelectric element 243 is fixed to a support plate 260*b* of the later-described vibration plate 260 so that the end thereof in the Z2 direction be a free end and is fixed to the end of the fixed plate 241 in the Z2 direction so that the end thereof in the Z1 direction be a fixed end.

The case 250 is provided between the circuit substrate 230 and the vibration plate 260. The case 250 is made of synthetic resin, such as polypropylene, for example. The case 250 includes the accommodation space 255 illustrated in FIG. 5 and the channel pipe FP. The accommodation space 255 is provided along the Y-axis and is composed of a recess opened in the Z1 direction. The accommodation space 255 accommodates the COF substrate 242, fixed plate 241, and piezoelectric element 243. The channel pipe FP is a cylindrical member protruding in the Z1 direction. The channel pipe FP allows the ink inlet 221 of the seal member 220 and a later-described ink inlet 261, which is included in the vibration plate 260, to communicate with each other. The channel pipe FP serves as a channel causing ink supplied from the corresponding liquid container 14 to flow into the ink inlet 261.

The vibration plate 260 is a substantially rectangular plate member that is elongated along the X-axis. The vibration plate 260 is provided between the case 250 and the pressure chamber substrate 270. The vibration plate 260 serves as a wall surface covering the surface of the pressure chamber substrate 270 that faces in the Z1 direction. The vibration plate 260 elastically deforms due to the piezoelectric element 243. Ink is thereby ejected from the later-described pressure chamber 275 through the nozzle N. The vibration plate 260 includes an elastic film 260*a* and the support plate 260*b*, which are stacked on top of each other. The elastic film 260*a* is made of an elastic material, such as resin film, for example. The support plate 260*b* is made of a metal material, such as stainless steel, and supports the elastic film 260*a*. The elastic film 260*a* is bonded to the surface of the support plate 260*b* that faces in the Z2 direction to be supported. The vibration plate 260 includes the ink inlet 261. The ink inlet 261 is a through-hole passing through the vibration plate 260 along the Z-axis. The ink inlet 261 allows the channel pipe FP to communicate with a channel 273, which is included in the pressure chamber substrate 270, thus causing ink supplied from the liquid container 14 to flow into the channel 273.

The pressure chamber substrate 270 is a plate member having a profile corresponding to the profile of the vibration plate 260. The pressure chamber substrate 270 is provided between the case 250 and the nozzle plate 280. The pressure chamber substrate 270 includes the channel 273. The pressure chamber substrate 270 includes the pressure chamber 275. The channel 273 and the pressure chamber 275 are described in detail later. In the first embodiment, the pressure chamber substrate 270 is composed of a silicon monocrystal substrate. The pressure chamber substrate 270 may be composed of a stack of plural substrates.

The nozzle plate 280 is a thin plate member having a profile substantially corresponding to the profile of the vibration plate 260 and pressure chamber substrate 270. The nozzle plate 280 is provided in the Z2 direction of the pressure chamber substrate 270. The nozzle plate 280 includes plural nozzle lines Ln, each composed of plural nozzles N aligned along the Y-axis. Each nozzle N is a through-hole passing through the nozzle plate 280 along the Z-axis for ejection of ink onto the medium PP. The plural nozzle lines Ln are arranged side by side along the X-axis. Each nozzle line Ln is provided at the position corresponding to the pressure chambers 275 in the pressure chamber substrate 270. The nozzle plate 280 serves as a wall surface that covers the surface of the pressure chamber substrate 270 that faces in the Z2 direction, other than portions corresponding to the nozzles N. The nozzle plate 280 is made of a metal material, such as stainless steel, for example. On a surface F1 of the nozzle plate 280, which faces in the Z2 direction, a liquid repellent film that repels ink is formed.

The cover 290 is a frame body accommodating the vibration plate 260, the pressure chamber substrate 270, and the nozzle plate 280. The cover 290 is made of a conductive metal material, for example. The cover 290 is provided with an opening that exposes the surface F1 of the nozzle plate 280 when the cover 290 accommodates the vibration plate 260, pressure chamber substrate 270, and nozzle plate 280. The cover 290 is fixed with a not-illustrated screw to the holder 210 with the case 250 and circuit substrate 230 interposed therebetween. The ejection surface FN is a surface including the surface F1 of the nozzle plate 280. Specifically, the ejection surface FN may be composed of only the surface F1 of the nozzle plate 280 or may be a surface including the surface F1 of the nozzle plate 280 and a surface F2 of the cover 290, which faces in the Z2 direction. The ejection surface FN of the first embodiment includes the surface F1 of the nozzle plate 280 and the surface F2 of the cover 290, which faces in the Z2 direction.

The aforementioned case 250, vibration plate 260, pressure chamber substrate 270, and nozzle plate 280 are individually secured to one another with an adhesive. Specifically, the surface of the nozzle plate 280 that faces in the Z1 direction adheres to the surface of the pressure chamber substrate 270 that faces in the Z2 direction with an adhesive. The surface of the pressure chamber substrate 270 that faces in the Z1 direction adheres to the surface of the vibration plate 260 that faces in the Z2 direction with an adhesive. The surface of the vibration plate 260 that faces in the Z1 direction adheres to the surface of the case 250 that faces in the Z2 direction with an adhesive.

The channel 219, which is formed in the holder 210, communicates with the channel 253, which is formed in the case 250. The channel 253 communicates with the channel 273 of the pressure chamber substrate 270. The pressure chamber substrate 270 defines the pressure chamber 275 in the X2 direction of the channel 273. As seen in the Z1 direction, the pressure chamber 275 is composed of the recess that is formed in the pressure chamber substrate 270 and is sealed by the elastic film 260*a* from the Z1 direction. Thus, the surface of the pressure chamber 275 that faces in the Z1 direction is composed of the elastic film 260*a* and is displaced with displacement of the piezoelectric element 243 to change the capacity of the pressure chamber 275. The pressure chambers 275 are arranged along the Y-axis corresponding to the nozzle lines Ln, although not illustrated. The pressure chamber 275 communicates with the channel 273 and the nozzle N. By changing the capacity of the pressure chamber 275, ink flowing from the channel 273 into the pressure chamber 275 is ejected through the nozzle N. The channel 219, channel 253, and channel 273 are therefore coupled to one of the nozzles N through the pressure chamber 275.

1-3. Configuration of Driving Signal Generation Circuit 2

Figure 6:
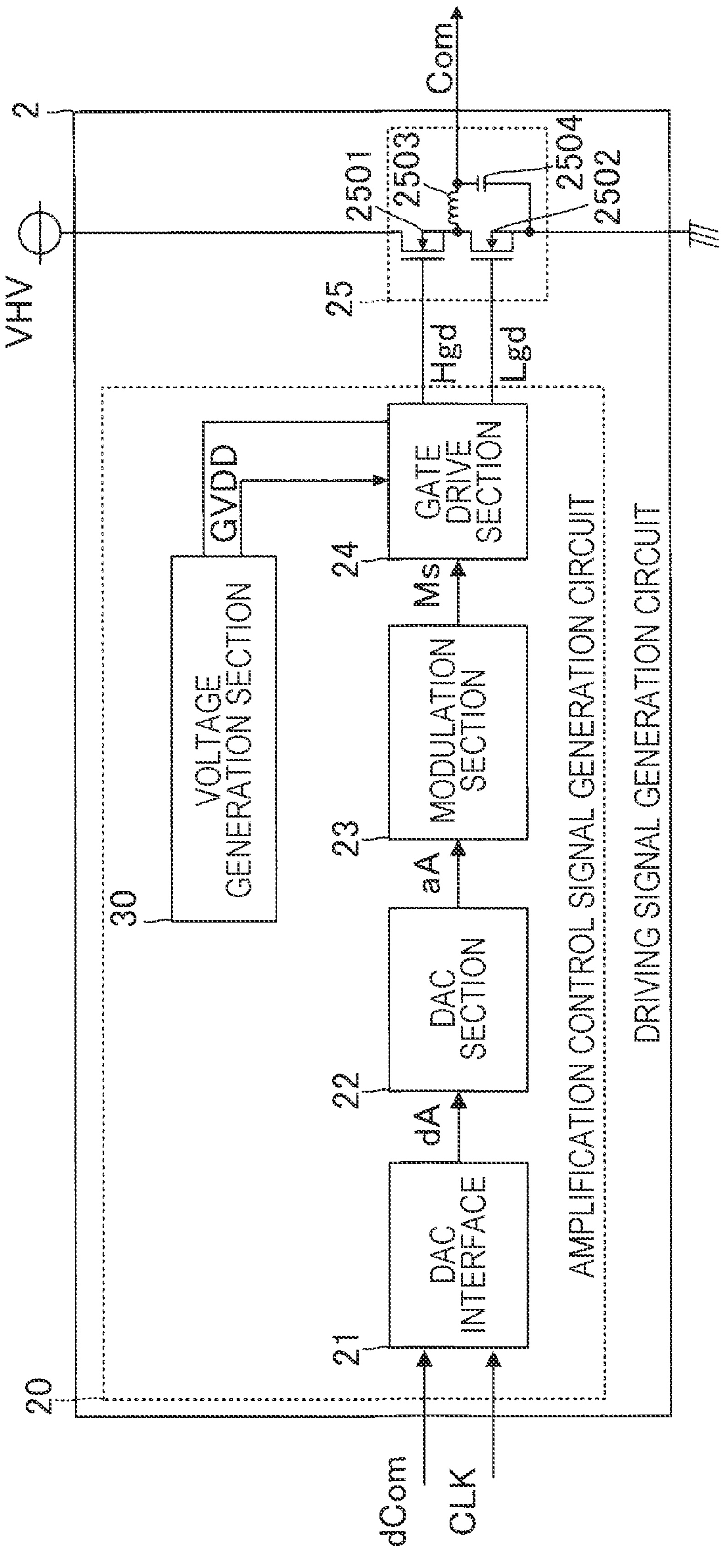
FIG. 6 is a block diagram of a driving signal generation circuit.

FIG. 6 is a block diagram of the driving signal generation circuit 2. The driving signal generation circuit 2 includes an amplification control signal generation circuit 20 and a driving signal output circuit 25. The amplification control signal generation circuit 20 generates amplification control signals Hgd and Lgd based on the waveform specifying signal dCom. The amplification control signal generation circuit 20 includes a DAC interface 21, a DAC section 22, a modulation section 23, and a gate drive section 24. "DAC" is an abbreviation for "digital to analog converter".

The DAC interface 21 receives the waveform specifying signal dCom, which is supplied from the controller 6, and a clock signal CLK, which is outputted from the controller 6. The DAC interface 21 generates 10-bit driving data dA, for example, which defines the waveform of the driving signal Com, based on the clock signal CLK and the waveform specifying signal dCom. The DAC section 22 receives the driving data dA. The DAC section 22 converts the received driving data dA to a base driving signal aA as an analogue signal. This base driving signal aA is an object signal before amplifying the driving signal Com. The modulation section 23 receives the base driving signal aA. The modulation section 23 performs pulse width modulation for the base driving signal aA and outputs the resulting signal as a modulated signal Ms. The gate drive section 24 receives voltage VHV, voltage GVDD, and the modulated signal Ms. The voltage VHV is a DC voltage of 42 volts, for example. The voltage GVDD is outputted from a voltage generation section 30, which is included in the amplification control signal generation circuit 20. The gate drive section 24 amplifies the received modulated signal Ms based on the voltage GVDD and shifts the resulting signal to the high-amplitude logic level based on the voltage VHV to generate the amplification control signal Hgd. The gate drive section 24 reverses the logic level of the received modulated signal Ms and amplifies the resulting signal based on the voltage GVDD to generate the amplification control signal Lgd. That is, the logic levels of the amplification control signals Hgd and Lgd are mutually exclusive. The amplification control signals Hgd and Lgd are inputted to the driving signal output circuit 25.

The driving signal output circuit 25 operates based on the amplification control signals Hgd and Lgd to output the driving signal Com. The driving signal output circuit 25 includes a transistor 2501, a transistor 2502, an inductor 2503, and a capacitor 2504. The transistors 2501 and 2502 are N-channel FETs, for example. "FET" is an abbreviation for "field effect transistor".

The drain terminal of the transistor 2501 is supplied with the voltage VHV. The gate terminal of the transistor 2501 is supplied with the amplification control signal Hgd. The source terminal of the transistor 2501 is electrically coupled to the drain terminal of the transistor 2502. The gate terminal of the transistor 2502 is supplied with the amplification control signal Lgd. The source electrode of the transistor 2502 is coupled to ground. The transistor 2501 coupled as described above operates according to the amplification control signal Hgd while the transistor 2502 operates according to the amplification control signal Lgd. That is, either the transistor 2501 or 2502 is exclusively on. At the point of connection between the source terminal of the transistor 2501 and the drain terminal of the transistor 2502, therefore, the amplified modulated signal resulting from amplification for the modulated signal Ms based on the voltage VHV is generated. The transistors 2501 and 2502 serve as an amplification circuit.

One end of the inductor 2503 is coupled to the source terminal of the transistor 2501 and the drain terminal of the transistor 2502 in common. The other end of the inductor 2503 is coupled to one end of the capacitor 2504. The other end of the capacitor 2504 is coupled to ground. The inductor 2503 and the capacitor 2504 constitute a low-pass filter. When the amplified modulated signal is supplied to the low-pass filter, the amplified modulated signal is demodulated into the driving signal Com. Thus, the driving signal Com is a signal generated by the switching operation of the driving signal output circuit 25 and is more specifically a signal generated by the switching operation of the transistors 2501 and 2502. The driving signal Com generated during execution periods of the printing operation and out-of-printing micro-vibration operation is a sinusoidal or a non-sinusoidal alternating-current (AC) signal. In the first embodiment, the driving signal Com is a signal including trapezoidal waves. The driving signal Com generated by the driving signal output circuit 25 is outputted from the driving signal generation circuit 2 and is then inputted to the driving circuit 242*a*. The configuration of the driving circuit 242*a* is described using FIG. 7.

1-4. Configuration of Driving Circuit 242*a*

Figure 7:
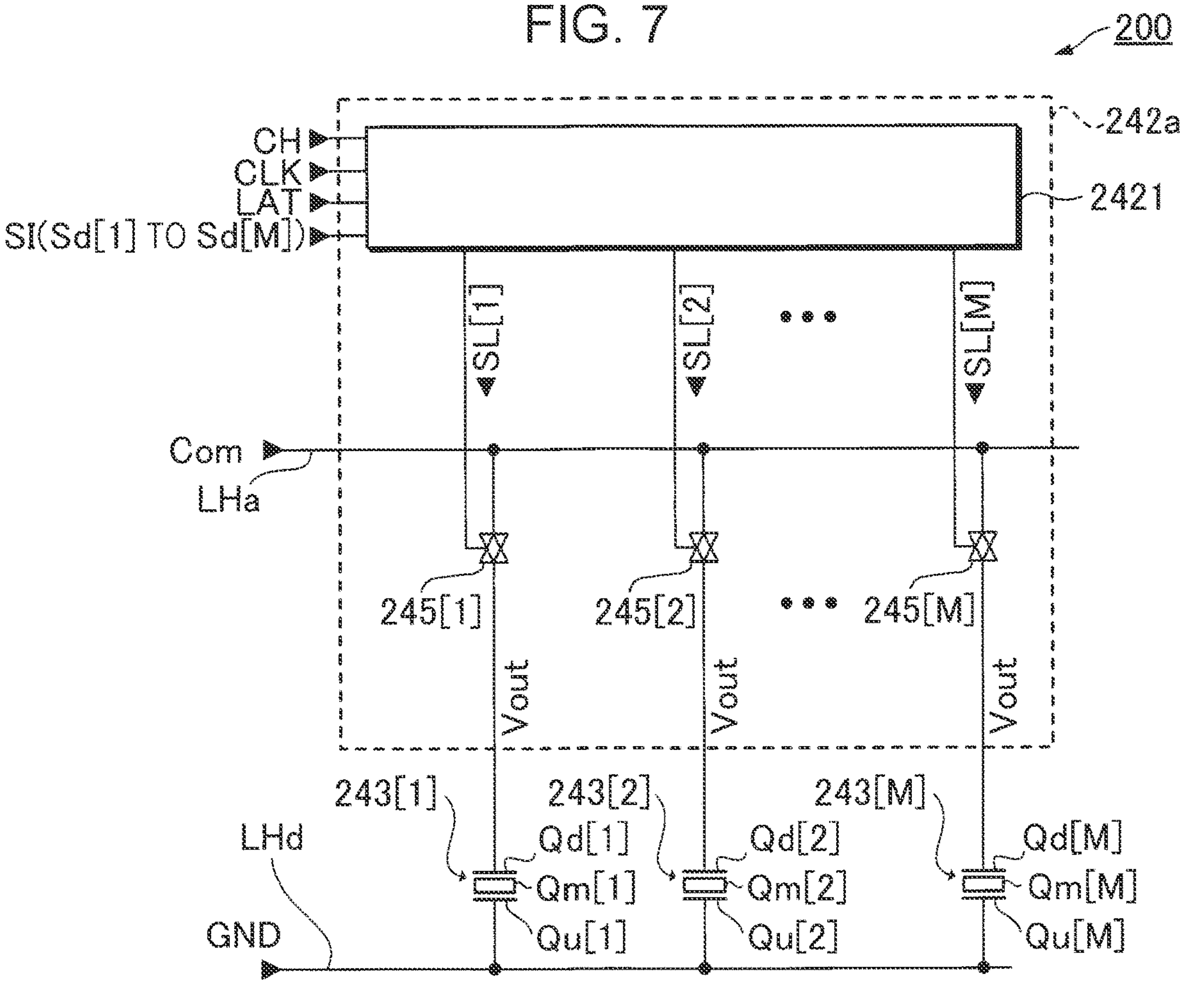
FIG. 7 is a block diagram illustrating a configuration example of a driving circuit.

FIG. 7 is a block diagram illustrating a configuration example of the driving circuit 242*a*. The liquid ejecting head 200 includes an internal line LHa and an internal line LHd. The internal line LHa is supplied with the driving signal Com from the driving signal generation circuit 2. The internal line LHd is coupled to ground potential GND.

In the example of FIG. 7, each driving circuit 242*a* controls M piezoelectric elements 243 corresponding to the M nozzles N constituting one of the nozzle lines Ln. Hereinafter, the M piezoelectric elements 243 are sometimes distinguished as the first, second, . . . M-th piezoelectric elements 243. The m-th piezoelectric element 243 is sometimes referred to as the piezoelectric element 243[*m*]. The variable m is an integer not less than 1 and not more than M. When a constituent component, a signal, or the like of the liquid ejecting apparatus 100 corresponds to the m-th piezoelectric element 243, the reference symbol indicating the constituent component, signal, or the like is sometimes given a suffix [m] indicating association with the m-th piezoelectric element 243.

As illustrated in FIG. 7, for every m value from 1 to M, the piezoelectric element 243[*m*] includes a first electrode Qu[m], a second electrode Qd[m], and a piezoelectric substance Qm[m], which is provided between the first electrode Qu[m] and the second electrode Qd[m]. In other words, the first electrode Qu[m] and the second electrode Qd[m] are a pair of electrodes provided so as to sandwich the piezoelectric substance Qm[m]. The internal line LHd is electrically coupled to the first electrode Qu[m] for every m value from 1 to M. The first and second electrodes Qu and Qd are an example of "a pair of electrodes provided to sandwich the piezoelectric substance".

As illustrated in FIG. 7, the driving circuit 242*a* includes M selection circuits 245[1] to 245[M] and a connection specifying circuit 2421. The selectin circuits 245[1] to 245[M] select whether to supply the driving signal Com to the piezoelectric elements 243[1] to 243[M] as driving signals Vout, respectively. The connection specifying circuit 2421 specifies the connection of the M selection circuits 245. The connection specifying circuit 2421 generates connection specifying signals SL[1] to SL[M], which specify on or off of the M selection circuits 245[1] to 245[M], based on the specifying signal SI supplied from the controller 6, the clock signal CLK, a latch signal LAT defining a cycle Tu of the waveform included in the driving signal Com, and a change signal CH defining a time period T1 and a time period T2 included in the cycle Tu. The configuration of any one of the M selection circuits 245 is described using FIG. 8.

Figure 8:
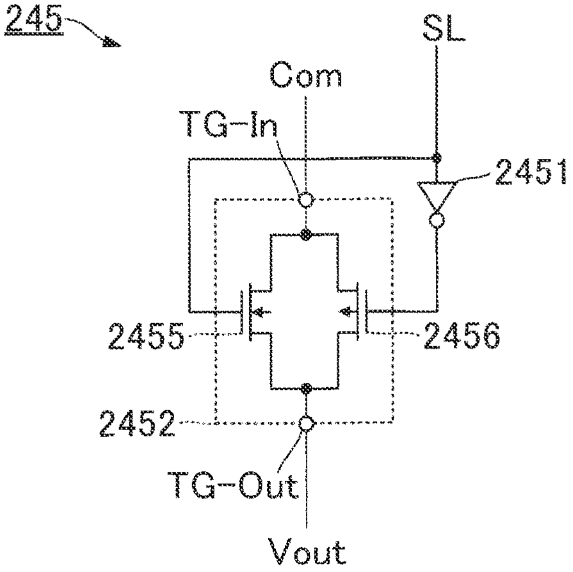
FIG. 8 is a circuit diagram illustrating the configuration of a selection circuit.

FIG. 8 is a circuit diagram illustrating the configuration of the selection circuit 245. As illustrated in FIG. 8, the selection circuit 245 includes an inverter 2451 and a transmission gate 2452. The transmission gate 2452 includes a transistor 2455 as an n-type MOS transistor and a transistor 2456 as a p-type MOS transistor. "MOS" is an abbreviation for "metal oxide semiconductor".

The connection specifying signal SL is supplied from the connection specifying circuit 2421 to the gate terminal of the transistor 2455. The connection specifying signal SL is also supplied to the gate terminal of the transistor 2455 with its logic inverted by the inverter 2451. The drain terminal of the transistor 2455 and the source terminal of the transistor 2456 are coupled to an input terminal TG-In as an end of the transmission gate 2452. The driving signal Com is inputted through the input terminal TG-In. The transistors 2455 and 2456 are controlled on or off according to the connection specifying signal SL, and the driving signal Com is thereby outputted as the driving signal Vout through an output terminal TG-Out as the other end of the transmission gate 2452, which is coupled to the source terminal of the transistor 2455 and the drain terminal of the transistor 2456 in common. The output terminal TG-Out is electrically coupled to the second electrode Qd of the piezoelectric element 243. In the following description, the state of the transistor 2455 or 2456 being controlled so as to be conducting is sometimes referred to as an ON state, and the state of the transistor 2455 or 2456 being controlled so as to be non-conducting is sometimes referred to as an OFF state. Thus, the selection circuit 245 is configured to perform the operation to switch between the ON and OFF states, according to the connection specifying signal SL. When the selection circuit 245 is in the ON state according to the connection specifying signal SL, the driving signal Com inputted through the input terminal TG-In is outputted through the output terminal TG-Out as the driving signal Vout. When the selection circuit 245 is in the OFF state according to the connection specifying signal SL, the driving signal Com inputted through the input terminal TG-In is not outputted through the output terminal TG-Out.

The description returns to FIG. 7. For any integer m from 1 to M, according to the connection specifying signal SL[m], the selection circuit 245[*m*] switches between conduction and non-conduction between the internal line LHa and the second electrode Qd[m] of the piezoelectric element 243[*m*]. For example, when the connection specifying signal SL[m] is high, the selection circuit 245[*m*] is on, and when the connection specifying signal SL[m] is low, the selection circuit 245[*m*] is off. The first electrode Qu[m] of the piezoelectric element 243[*m*] is coupled to the ground potential GND. The piezoelectric element 243[*m*] is driven depending on the potential difference between the driving signal Vout and the ground potential GND. The amount of ink ejected through the nozzle N[m] is thus dependent on the potential difference.

1-5. Driving Signal Com

In the first embodiment, the period of time the liquid ejecting apparatus 100 executes the printing operation and the period of time the liquid ejecting apparatus 100 executes the out-of-printing micro-vibration operation include one or more cycles Tu. The operation of the liquid ejecting apparatus 100 in a certain cycle Tu is described using FIG. 9.

Figure 9:
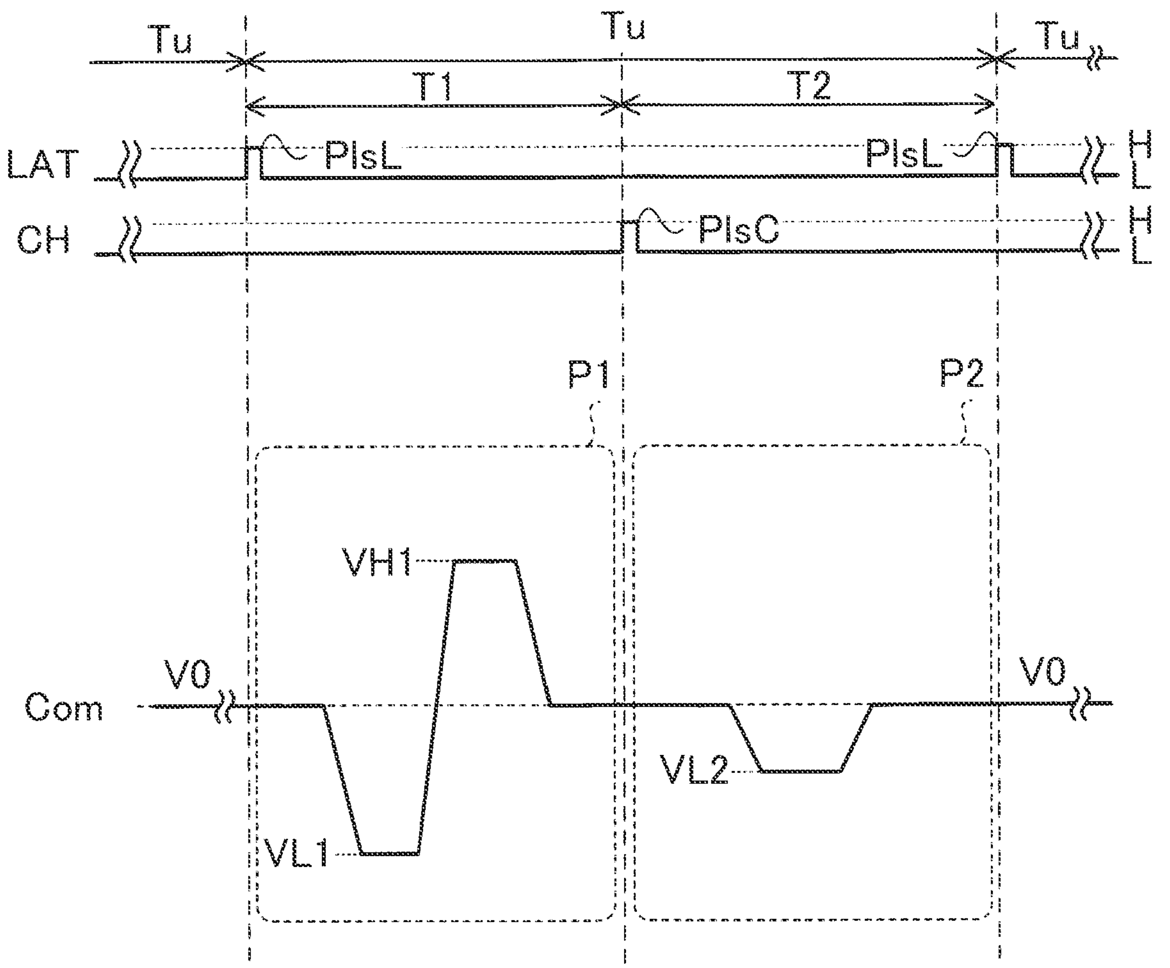
FIG. 9 illustrates a timing chart for explaining a driving signal.

FIG. 9 is a timing chart for explaining the driving signal Com. FIG. 9 illustrates the driving signal Com, latch signal LAT, and change signal CH supplied to the liquid ejecting head 200.

As illustrated in FIG. 9, the controller 6 outputs the latch signal LAT including pulses PlsL. The controller 6 thereby defines the cycle Tu as a period of time from the rising edge of a pulse PlsL to the rising edge of the next pulse PlsL. The cycle Tu is a cycle at which a new dot is formed on the medium PP. The controller 6 also outputs the change signal CH including pulses PlsC. The controller 6 thereby defines a time period T1 from the rising edge of a pulse PlsL to the rising edge of a pulse PlsC and a time period T2 from the rising edge of the pulse PlsC to the rising edge of the next pulse PlsL. The cycle Tu is divided into the time period T1 and the time period T2 by the change signal CH and latch signal LAT.

The specifying signal SI includes individual specifying signals Sd[1] to Sd[M], which specify the driving mode of the piezoelectric elements 243[1] to 243[M] for the time period T1 and the time period T2, which are specified by the latch signal LAT and change signal CH. Prior to the start of each cycle Tu, the controller 6 supplies the specifying signal SI including the individual specifying signals Sd[1] to Sd[M] to the connection specifying circuit 2421 in synchronization with the clock signal CLK. In this case, the connection specifying circuit 2421 generates the connection specifying signal SL[m] based on the individual specifying signal Sd[m] for every m value from 1 to M in the cycle Tu. For every m value from 1 to M, the individual specifying signal Sd[m] is a signal to specify whether to drive the piezoelectric element 243[*m*] with the driving signal Com in each of the time periods T1 and T2.

The driving signal generation circuit 2 outputs the driving signal Com including an ejection waveform P1 and a micro-vibration waveform P2. The driving signal Com is outputted in the execution period of the printing operation and the execution period of the out-of-printing micro-vibration operation. The ejection waveform P1 is a waveform to drive the piezoelectric element 243 such that ink within the nozzle N is shaken sufficiently to be ejected through the nozzle N. The micro-vibration waveform P2 is a waveform to drive the piezoelectric element 243 to vibrate ink within the nozzle N by a certain degree not ejecting the ink from the nozzle N. The designer of the liquid ejecting apparatus 100 determines the ejection waveform P1 and the micro-vibration waveform P2 so that the potential difference between a highest potential VH1 and a lowest potential VL1 in the ejection waveform P1 be greater than the potential difference between a reference potential V0 and a lowest potential VL2 in the micro-vibration waveform P2. The highest potential VH1 is higher than the reference potential V0. The lowest potential VL1 and lowest potential VL2 are lower than the reference potential V0.

In the execution period of the printing operation, the piezoelectric element 243[*m*] corresponding to the nozzle N that is necessary to form an image on the medium PP is supplied with the ejection waveform P1. In the execution period of the printing operation, the above-described in-printing micro-vibration operation may be executed. The in-printing micro-vibration operation supplies in the execution period of the printing operation, the micro-vibration waveform P2 to the piezoelectric element 243[*m*] that is not supplied with the ejection waveform P1 in the cycle Tu. This can reduce an increase in ink viscosity within the nozzle N and pressure chamber 275 corresponding to the piezoelectric element 243[*m*] that is not supplied with the ejection waveform P1 for a certain period of time during the execution period of the printing operation.

The out-of-printing micro-vibration operation supplies the micro-vibration waveform P2 to all the piezoelectric elements 243 in a certain period of time other than the execution period of the printing operation. In the first embodiment, the certain period of time corresponds to a period of time from when the printing operation is completed to when a later-described head power saving mode is started.

When the individual specifying signal Sd[m] specifies to drive the piezoelectric element 243[*m*] with the ejection waveform P1, the connection specifying circuit 2421 sets high, the connection specifying signal SL[m] to be supplied immediately after the time period T1 starts. When the connection specifying signal SL[m] set high is supplied to the selection circuit 245[*m*], the selection circuit 245[*m*] is set to the ON state, in which the signal inputted to the input terminal TG-In is outputted from the output terminal TG- Out. The ON state of the selection circuit 245[*m*] is maintained until the connection specifying signal SL[m] set low is supplied to the selection circuit 245[*m*]. When the selection circuit 245[*m*] is in the ON state in the time period T1, the piezoelectric element 243[*m*] is driven with the ejection waveform P1 in the time period T1 to eject ink. Ink is thereby ejected through the nozzle N[m] to form a dot on the medium PP.

When the individual specifying signal Sd[m] specifies to not drive the piezoelectric element 243[*m*] with the ejection waveform P1, the connection specifying circuit 2421 sets low, the connection specifying signal SL[m] to be supplied immediately after the time period T1 starts. When the connection specifying signal SL[m] set low is supplied to the selection circuit 245[*m*], the selection circuit 245[*m*] is set to the OFF state, in which the signal inputted to the input terminal TG-In is not outputted from the output terminal TG-Out. The OFF state of the selection circuit 245[*m*] is maintained until the connection specifying signal SL[m] set high is supplied to the selection circuit 245[*m*]. When the selection circuit 245[*m*] is in the OFF state in the time period T1, the piezoelectric element 243[*m*] is not driven in the time period T1, and no ink is ejected from the nozzle N[m].

When the individual specifying signal Sd[m] specifies to drive the piezoelectric element 243[*m*] with the micro-vibration waveform P2, the connection specifying circuit 2421 sets high, the connection specifying signal SL[m] to be supplied immediately after the time period T2 starts. When the selection circuit 245[*m*] is in the ON state in the time period T2, the piezoelectric element 243[*m*] is driven with the micro-vibration waveform P2 in the time period T2 to vibrate ink within the nozzle N[m] by a certain degree not ejecting the ink from the nozzle N[m].

When the individual specifying signal Sd[m] specifies to not drive the piezoelectric element 243[*m*] with the micro-vibration waveform P2, the connection specifying circuit 2421 sets low, the connection specifying signal SL[m] to be supplied immediately after the time period T2 starts. When the selection circuit 245[*m*] is in the OFF state in the time period T2, the piezoelectric element 243[*m*] is not driven in the time period T2 and does not vibrate ink within the nozzle N[m].

In the first embodiment, the driving signal Com includes the ejection waveform P1 in the time period T1 and the micro-vibration waveform P2 in the time period T2. However, the driving signal Com is not limited to this configuration. The driving signal Com may include the micro-vibration waveform P2 in the time period T1 and the ejection waveform P1 in the time period T2.

1-6. Power Consumption After Printing Operation

In order to reduce the power consumption of the liquid ejecting apparatus 100 while implementing quick response of the liquid ejecting apparatus 100 to the print instruction from the host computer, as a comparative aspect, the liquid ejecting apparatus 100 can transition to a power saving mode when the standby state continues for a certain period following execution of the printing operation. In the power saving mode, electric power is supplied to only necessary portions and supply of electric power to the other portions is stopped. According to the comparative aspect, the liquid ejecting apparatus 100 can immediately restart the printing operation when receiving a print instruction in the standby state. However, electric power is wasted during a given period of time between when the liquid ejecting apparatus 100 completes the printing operation and when the liquid ejecting apparatus 100 transitions to the power-saving mode.

The operation modes of the liquid ejecting apparatus 100 according to the first embodiment therefore include two power-saving modes: a head power-saving mode and a printer power-saving mode. The mode other than the two power-saving modes is sometimes referred to as a printable mode. In the printable mode, the liquid ejecting apparatus 100 is able to immediately execute the printing operation upon receiving a print instruction. The power consumption of the liquid ejecting apparatus 100 per unit period in the head power-saving mode is less than that in the printing operation. The power consumption of the liquid ejecting apparatus 100 per unit period in the printer power-saving mode is less than that in the head power-saving mode. The unit period is shorter than the period of time the head power-saving mode is executed and the period of time the printer power-saving mode is executed. The period of time taken for the liquid ejecting apparatus 100 to transition from the head power-saving mode to the printing operation is shorter than the period of time taken to transition from the printer power-saving mode to the printing operation. After completing the printing operation, the liquid ejecting apparatus 100 transitions from the printable mode to the head power-saving mode to stop the operations of the driving signal generation circuit 2 and driving circuit 242*a*. "To stop the operation of the driving signal generation circuit 2" is to stop the switching operation of the driving signal output circuit 25 so as not to generate the driving signal Com. In the first embodiment, when the switching operation of the driving signal output circuit 25 is stopped, the driving signal output circuit 25 outputs a constant direct-current (DC) voltage signal not containing ripples (high-frequency AC components) instead of the driving signal Com. Stopping the switching operation of the driving signal output circuit 25 can reduce the power consumption in the head power-saving mode. "To stop the operation of the driving circuit 242*a*" is to turn off the selection circuit 245 by supplying the connection specifying signal SL set low to the selection circuit 245 being in the ON state when the printing operation is completed or when the out-of-printing micro-vibration operation executed after completion of the printing operation is completed. When the driving circuit 242*a* is stopped, the selection circuit 245 does not output the signal inputted to the input terminal TG-In from the output terminal TG-Out, thus reducing the power consumption in the head power-saving mode. The liquid ejecting apparatus 100 then transitions to the printer power-saving mode at the end of a predetermined period of time following completion of the printing operation. The predetermined period of time is a period of time from the time the printing operation is completed to the time the printer power-saving mode is started. The predetermined period of time is a setting period of time that can be optionally set by the user of the liquid ejecting apparatus 100 plus a period of time from when the printing operation is completed to when the capping operation executed after completion of the printing operation is completed. The length of the setting period of time is 1 to 60 minutes, for example. The length of the period of time from the time the printing operation is completed to the time the capping operation is completed is seven seconds, for example. The head power-saving mode is an example of "a first mode", and the printer power-saving mode is an example of "a second mode".

The head power-saving mode is a mode in which the operation of the driving circuit 242*a* in the liquid ejecting head 200 and the operation of the driving signal generation circuit 2 are stopped. In the head power-saving mode, the printing operation, that is, the operations of the driving circuit 242*a* and driving signal generation circuit 2 operating in the printable mode are stopped. The power consumption per unit period in the head power-saving mode is therefore less than that of the printing operation, that is, that in the printable mode.

The printer power-saving mode is a mode to stop the operations of the circuits configured to stop operating in the head power-saving mode and the operations of some circuits different from the driving circuit 242*a* and driving signal generation circuit 2 among the plural circuits in the liquid ejecting apparatus 100. The operation to stop the operations of some circuits different from the driving circuit 242*a* and driving signal generation circuit 2 is an operation to execute at least one of: stopping power supply to the circuits; setting the voltage supplied to the circuits from the power supply lower than that in the head power-saving mode; and setting the clock frequency lower than that in the head power-saving mode.

The circuits different from the driving circuit 242*a* and driving signal generation circuit 2 configured to stop operating in the printer power-saving mode include the controller 6, the driving circuit to drive the carriage motor, the driving circuit to drive the transport mechanism 8, one or plural driving circuits to drive one or plural devices included in the maintenance mechanism 4, and a driving circuit to supply an electric signal to a not-illustrated liquid crystal panel, for example.

In the printer power-saving mode, the clock frequency of the controller 6 may be set lower than that in the head power-saving mode.

In the printer power-saving mode, any one of the following operations may be executed: stopping power supply to the driving circuit to drive the carriage motor or the driving circuit to drive the transport mechanism 8; or reducing the power supply voltage to be supplied from the power supply to the driving circuits.

The one or plural devices included in the maintenance mechanism 4 are at least one of one or both of the pressure pump and the suction pump 44, the valve, the elevation mechanism 43, which moves the cap 41, and the mechanism to move the wiping member 42, for example. One or plural driving circuits to drive the one or plural devices included in the maintenance mechanism 4 are one or plural driving circuits to drive at least one of one or both of the pressure pump and the suction pump 44, the valve, the elevation mechanism 43, which moves the cap 41, and the mechanism to move the wiping member 42, for example. In the printer power-saving mode, the power supply to the one or plural driving circuits may be stopped or the power supply voltage to be supplied from the power supply to the one or plural driving circuits may be set lower than that in the head power-saving mode.

The liquid crystal panel is able to execute at least one of the functions of receiving an instruction from the user or displaying information concerning the liquid ejecting apparatus 100 to the user. In the printer power-saving mode, the light source, such as a back light, for the liquid crystal panel may be turned off by stopping the power supply to the driving circuit that supplies an electric signal to the liquid crystal panel or by setting the power supply voltage to be supplied from the power supply to the driving circuit lower than that in the head power-saving mode.

On the other hand, circuits that continue operating in the printer power-saving mode are a circuit constituting the mechanical contact sensor 11 and a circuit constituting the photosensor 12, for example.

As described above, in the printer power-saving mode, the operations of the circuits that operate in the head power-saving mode are stopped. The power consumption per unit period in the printer power-saving mode is therefore less than that in the head power-saving mode. The driving signal generation circuit 2 and driving circuit 242*a* are an example of "one or plural circuits including a driving signal generation circuit". Any one of the controller 6, the driving circuit to drive the carriage motor, one or plural driving circuits to drive the one or plural devices included in the maintenance mechanism 4, and the driving circuit to supply an electric signal to the liquid crystal panel is an example of "a first circuit".

1-7. Deterioration of Liquid Repellent Film After Printing Operation

In the comparative aspect, the liquid ejecting apparatus 100 transitions to the power saving mode, which supplies electric power to only necessary portions and stops supplying electric power to the other portions, when the standby state continues for a certain period of time following execution of the printing operation, in order to reduce the power consumption of the liquid ejecting apparatus 100 while implementing quick response of the liquid ejecting apparatus 100 to the print instruction from the host computer. In the comparative aspect, however, the liquid repellent film formed on the ejection surface FN can deteriorate during the period of time from when the liquid ejecting apparatus 100 completes the printing operation to when the liquid ejecting apparatus 100 transitions to the power-saving mode. Such deterioration of the liquid repellent film can reduce the ink ejection performance. For example, when the liquid repellent film deteriorates and exposes the metal material in part of the ejection surface FN, ink adheres to the exposed part of the metal material. When ink adheres to part of the ejection surface FN, the amount of ink ejected can be reduced, causing a failure in dot size, or the direction that ink is ejected can change, causing a failure in dot position on the medium PP. Furthermore, ink staying on part of the ejection surface FN can fall on the medium PP to form a dot in an unintended position.

In the comparative example, the liquid repellent film formed in the nozzle plate 280 can deteriorate because of the following reason. In the comparative aspect, the driving signal generation circuit 2 remains operating in the standby state until the liquid ejecting apparatus 100 transitions to the power-saving mode after completing the printing operation. "The driving signal generation circuit 2 is operating" indicates that the driving signal output circuit 25 is performing the switching operation. In the standby state of the comparative aspect, the driving signal output circuit 25 is supplied with the amplification control signals Hgd and Lgd from the amplification control signal generation circuit 20 and performs the switching operation to generate the driving signal Com. The driving signal Com is generated using the low pass filter composed of the inductor 2503 and capacitor 2504 as described above. However, the driving signal Com contains high-frequency AC components, that is, so-called ripples that cannot be removed with the low pass filter. The ripples are caused by the switching operation of the driving signal output circuit 25. Herein, parasitic capacitances are formed between the input terminal TG-In of the driving circuit 242*a* and the ground and between the output terminal TG-Out of the driving circuit 242*a* and the ground. Parasitic capacitances behave like capacitors and conduct AC component current in a similar manner to capacitors. Capacitors are more likely to conduct alternating current with higher frequency, and ripples tend to flow through capacitors in particular. In the standby state of the comparative aspect, therefore, ripples of the driving signal Com supplied to the driving circuit 242*a* flow through the selection circuit 245 to the piezoelectric element 243 independently of whether the operation of the driving circuit 242*a* is stopped.

Herein, each of the nozzle plate 280 and the support plate 260*b* is made of a conductive metal material. Between the nozzle plate 280 and the support plate 260*b*, the elastic film 260*a*, which is made of resin film, and the pressure chamber substrate 270, which is made of silicon, are provided. The nozzle plate 280 and the support plate 260*b* are considered to constitute a capacitor as respective electrodes. Herein, the elastic film 260*a*, the pressure chamber substrate 270, and ink within the pressure chamber 275 serve as a dielectric substance. Since capacitors conduct AC component current as described above, ripples of the driving signal Com having flowed to the piezoelectric element 243 flow to the nozzle plate 280. The nozzle plate 280 is grounded through the cover 290, which is made of a metal material. When current flows through the nozzle plate 280, hydrogen ions gather around the nozzle plate 280, and hydrogen is generated. The generated hydrogen attacks the liquid repellent film of the nozzle plate 280, deteriorating the liquid repellent film.

In the head power-saving mode of the first embodiment, the operation of the driving signal generation circuit 2 is stopped, and the driving signal output circuit 25 does not generate the driving signal Com containing ripples. Thus, no ripples flow to the piezoelectric element 243 from the driving signal generation circuit 2, so that any current caused by ripples does not flow to the nozzle plate 280. This can reduce deterioration of the liquid repellent film of the nozzle plate 280.

1-8. Operation of Liquid Ejecting Apparatus 100

Figure 10:
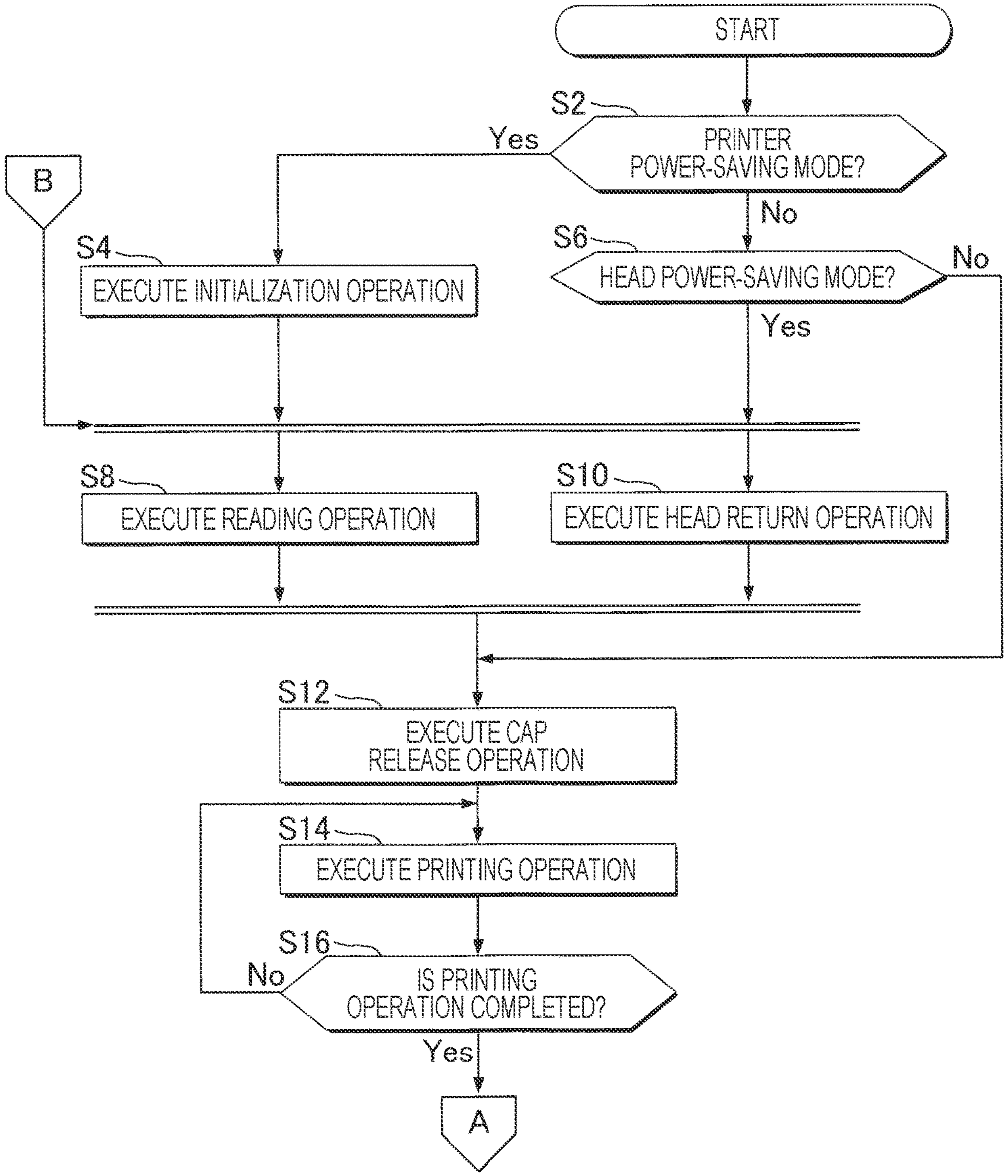
FIG. 10 is a flowchart illustrating an operation of the liquid ejecting apparatus.
Figure 11:
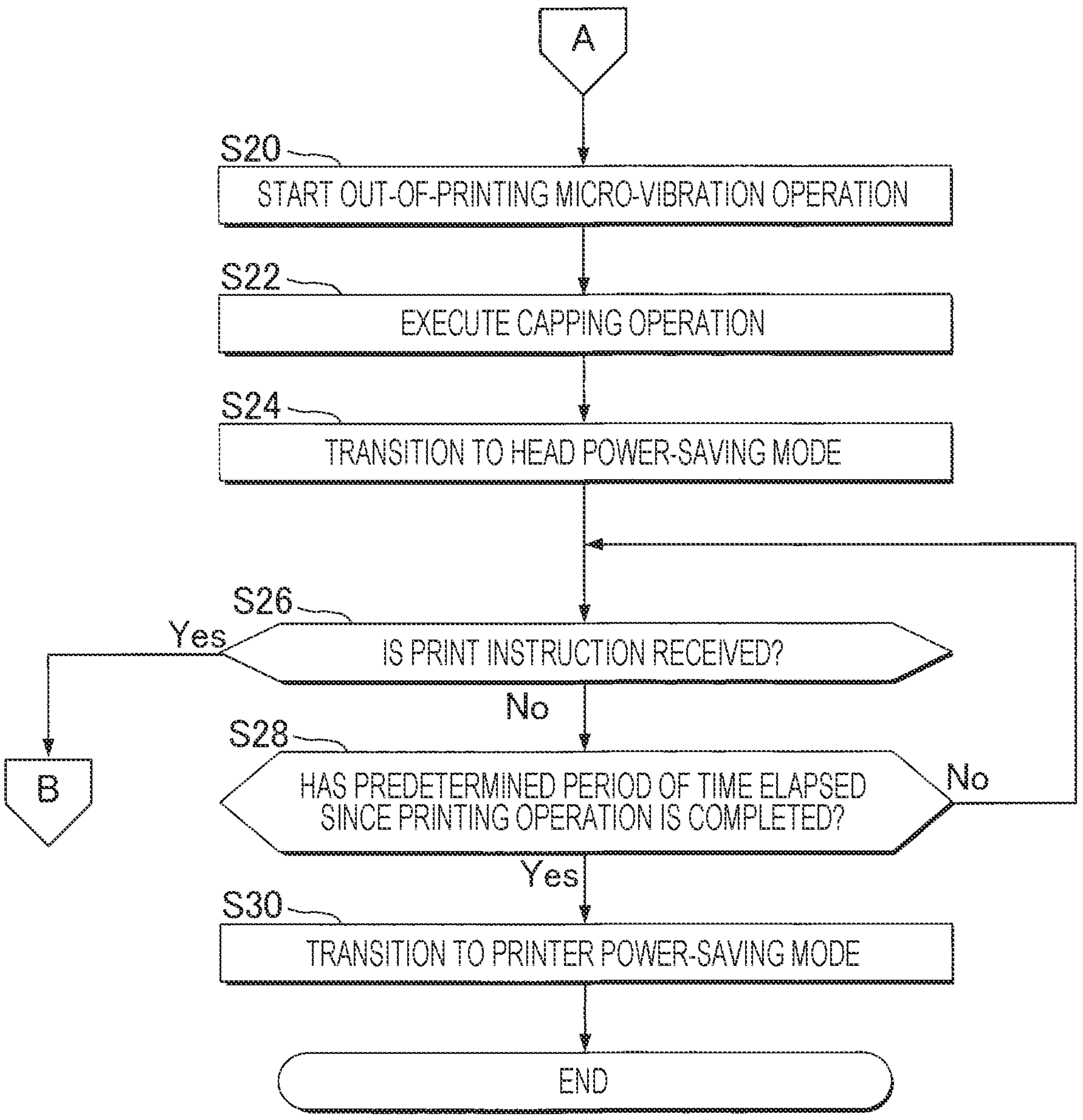
FIG. 11 is a flowchart illustrating the operation of the liquid ejecting apparatus.

FIGS. 10 and 11 are flowcharts illustrating the operation of the liquid ejecting apparatus 100. The two horizontal double lines illustrated in FIG. 10 indicate that processes therebetween can be executed in parallel. The flowcharts in FIGS. 10 and 11 illustrate a series of processes of the liquid ejecting apparatus 100 after the liquid ejecting apparatus 100 receives a print instruction from the host computer.

Upon receiving the print instruction, in step S2, the controller 6 determines whether the liquid ejecting apparatus 100 is in the printer power-saving mode. When the determination result in step S2 is positive, the controller 6 executes an initialization operation in step S4. The initialization operation is an operation to perform preliminary preparation for the printing operation including: checking the position of the liquid ejecting head 200, that is, the position of the carriage 71; checking whether capping performed by the capping operation before transition to the printer power-saving mode is properly conducted; and starting the operations of one or plural circuits that are stopped only in the aforementioned printer power-saving mode. The process (hereinafter, referred to as a capping checking process) of checking whether capping is properly conducted may be implemented by detecting the load that is produced in the driving mechanism 432 of the elevation mechanism 43 when the cap 41 is pressed against the ejection surface FN by the elevation mechanism 43 moving so as to move the cap 41 along the Z-axis in the Z1 direction, for example. Herein, in the capping state implemented by the capping operation, a not-illustrated pin provided for the cap 41 is inserted into a hole provided for the carriage 71. The capping checking process may be configured to check whether capping is properly performed by detecting the load that is produced on the motor configured to move the carriage 71 when the carriage 71 is moved along the X-axis with the pin inserted in the hole. After completion of the process in step S4, the controller 6 executes the process in step S8 and the process in step S10 in parallel.

When the determination result in step S2 is negative, in step S6, the controller 6 determines whether the liquid ejecting apparatus 100 is in the head power-saving mode. When the determination result in step S6 is positive, the controller 6 executes the process in step S8 and the process in step S10 in parallel.

In step S8, the controller 6 executes a reading operation. The reading operation is a process to read from the memory unit 5, state information indicating the state concerning the liquid ejecting apparatus 100 immediately before the liquid ejecting apparatus 100 transitions to the head power-saving mode. The state information is one or both of information indicating which nozzle N has failed to eject ink among the plural nozzles N and information indicating the amount of ink remaining in the liquid containers 14, for example. The controller 6 updates the state information stored in the memory unit 5 immediately after the printing operation is completed, for example.

In step S10, the controller 6 executes a head return operation. As the head return operation, the controller 6 restarts supplying the amplification control signals Hgd and Lgd from the amplification control signal generation circuit 20 to the driving signal output circuit to start the operation of the driving signal generation circuit 2. In other words, the head return operation is an operation to cause the driving signal output circuit 25 to restart the switching operation. The head return operation is an example of "an operation to return to the printable mode from the first mode".

After the process in step S8 and the process in step S10 are completed, the operation mode of the liquid ejecting apparatus 100 transitions to the printable mode. After the transition to the printable mode, the controller 6 executes a cap release operation in step S12. In the cap release operation, the relative position of the cap 41 to the ejection surface FN is changed so as to undo the formation of the closed space CS, that is, so as to eliminate the contact of the seal member 41*c*, which is provided at the top end of the side wall 41*b* of the cap 41, with the ejection surface FN. After completion of the process in step S12, the controller 6 controls the liquid ejecting head 200 and other components in step S14 to execute the printing operation. When the determination result in step S6 is negative, that is, when the liquid ejecting apparatus 100 is in the printable mode, the controller 6 executes the process in step S12 and then the process in step S14.

As described above, by the time of transition from the head power-saving mode to the printing operation, the process in step S8 and the process in step S10 are executed. On the other hand, by the time of transition from the printer power-saving mode to the printing operation, the process in step S4 is executed before the process in step S8 and the process in step S10. The period of time taken to transition from the head power-saving mode to the printing operation is shorter than the period of time taken to transition from the printer power-saving mode to the printing operation. In other words, the period of time taken for the liquid ejecting apparatus 100 to return to the printing operation from termination of the head power-saving mode is shorter than the period of time taken to return to the printing operation from termination of the printer power-saving mode.

After completion of the process in step S14, the controller 6 determines in step S16 whether the printing operation is completed. When the determination result in step S16 is negative, the controller 6 continues executing the printing operation.

When the determination result in step S16 is positive, the controller 6 controls the liquid ejecting head 200 to start the out-of-printing micro-vibration operation in step S20. In the first embodiment, the controller 6 continues executing the out-of-printing micro-vibration operation until transition to the head power-saving mode.

After completion of the process in step S20, the controller 6 executes the capping operation by controlling the movement mechanism 7 and the elevation mechanism 43 in step S22. Next, the liquid ejecting apparatus 100 transitions to the head power-saving mode in step S24. Specifically, the controller 6 starts the head power-saving mode at substantially the same time as when the capping operation is completed. "The time the capping operation is completed" is the time the cap 41 comes into contact with the ejection surface FN to form the closed space CS, to which the nozzles N are opened. "Substantially the same time as when the capping operation is completed" is, for example, within five seconds before or after the capping operation is completed and includes the exact time the capping operation is completed. "Substantially the same time as when the capping operation is completed" may be within three seconds before or after the capping operation is completed or may be within one second before or after the capping operation is completed. The controller 6 preferably starts the head power-saving mode within three seconds before or after the capping operation is completed and more preferably starts the head power-saving mode within one second before or after the capping operation is completed. Furthermore, the controller 6 stops the switching operation of the driving signal output circuit 25 to stop the operation of the driving signal generation circuit 2 and supplies the connection specifying signal SL set low to the selection circuit 245 being in the ON state to stop the operation of the driving circuit 242*a*.

After completion of the process in step S24, the controller 6 determines in step S26 whether a print instruction is received from the host computer. When the determination result in step S26 is positive, the controller 6 executes the process in step S8 and the process in step S10 in parallel.

When the determination result in step S26 is negative, the controller 6 determines in step S28 whether a predetermined period of time has elapsed since the printing operation is completed. When the determination result in step S28 is negative, the controller 6 returns the process to step S26. When the determination result in step S28 is positive, the liquid ejecting apparatus 100 transitions to the aforementioned printer power-saving mode in step S30. After completion of the process in step S30, the liquid ejecting apparatus 100 terminates the series of processes illustrated in FIGS. 10 and 11.

Figure 12:
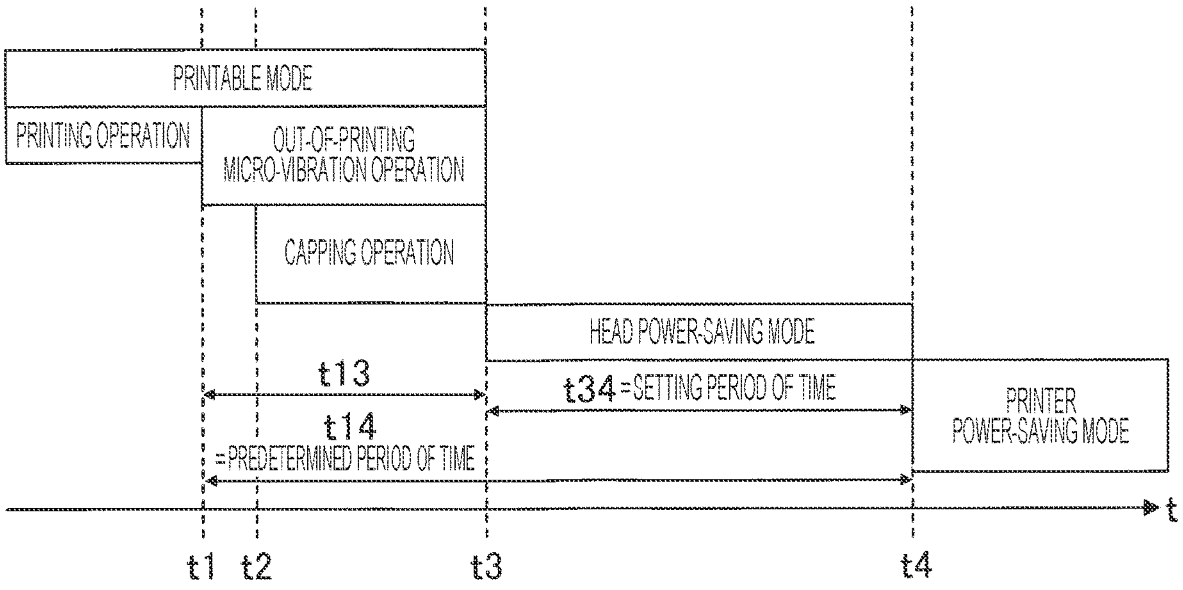
FIG. 12 is a diagram for explaining the execution sequence of a series of processes after completion of the printing operation.

FIG. 12 is a diagram for explaining the execution sequence of a series of processes after completion of the printing operation. FIG. 12 is a timing chart with time t represented on the horizontal axis. In FIG. 12, it should be noted that the length of each period represented by width on the horizontal axis t does not exactly indicate the actual period of each operation. Specifically, FIG. 12 illustrates an execution sequence of the series of processes in step S14, step S16, step S20, step S22, step S24, step S26, step S28, and step S30, which are illustrated in FIGS. 10 and 11. In FIG. 12, the determination results in step S16 and step S28 are positive, and the determination result in step S26 is negative. When the printing operation is completed at time t1, the controller 6 executes the out-of-printing micro-vibration operation from time t1 to time t3. Time period t13 from time t1 to time t3 is seven seconds, for example.

The controller 6 executes the capping operation from time t2, which is in between time t1 and time t3, to time t3. At time t3, the liquid ejecting apparatus 100 transitions to the head power-saving mode. Time period t13 of the first embodiment is a period of time from the time t1, at which the printing operation is completed, to time t3, at which the capping operation is completed. In the example of FIG. 12, the time the capping operation is completed and the time the head power-saving mode is started are both time t3. However, the time the capping operation is completed and the time the head power-saving mode is started may be different from each other within five seconds as described in the process in step S24. Time period t34 from time t3 to time t4, which is later than time t3, corresponds to the setting period of time that can be optionally set by the user of the liquid ejecting apparatus 100.

At time t4, which is later than time t3, the liquid ejecting apparatus 100 transitions to the printer power-saving mode. Time period t14 from time t1 to time t4 corresponds to the predetermined period of time. As understood from FIG. 12, the predetermined period of time is the setting period of time plus seven seconds as time period t13.

Figure 13:
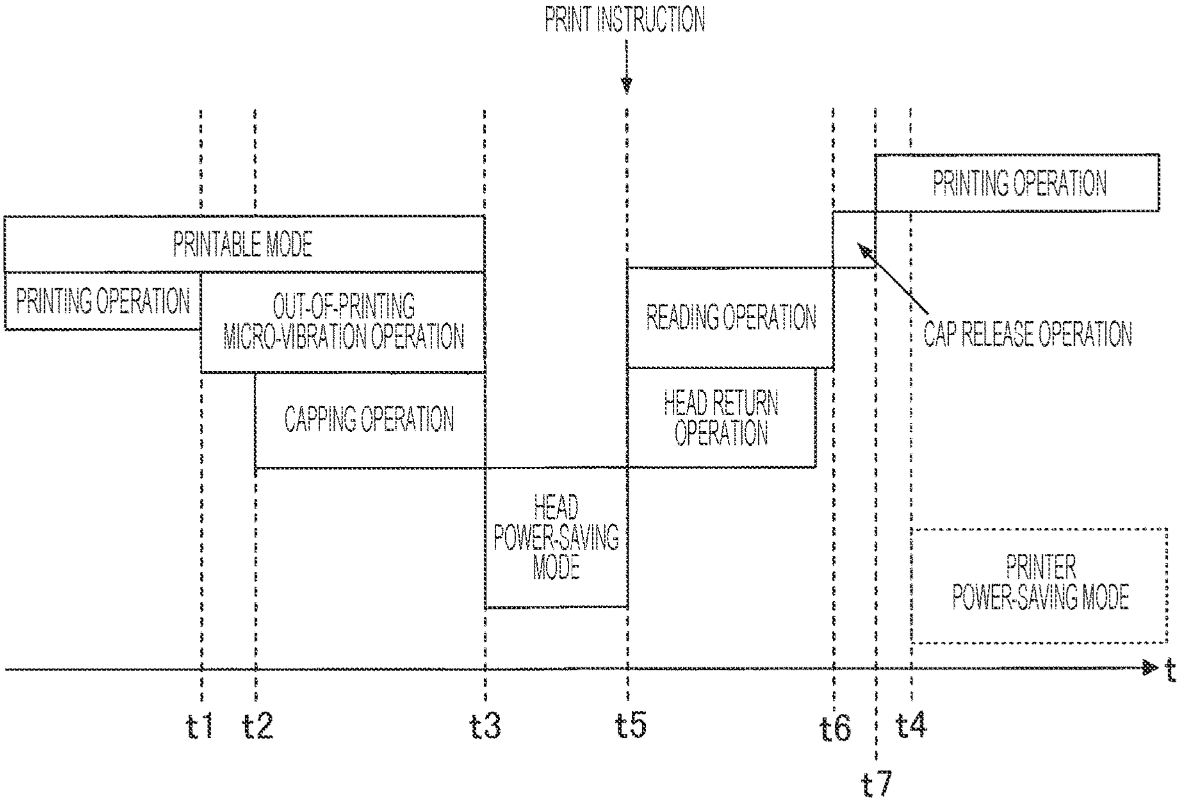
FIG. 13 is a diagram for explaining the execution sequence of a series of processes when a print instruction is received after completion of the printing operation.

FIG. 13 is a diagram for explaining the execution sequence of a series of processes when a print instruction is received after completion of the printing operation. FIG. 13 is a timing chart with time t represented on the horizontal axis. In FIG. 13, it should be noted that period length represented by width on the horizontal axis t does not exactly indicate the actual period of each operation. FIG. 13 illustrates an example in which a print instruction is received from the host computer at time t5, which is not later than time t3 and not earlier than time t4. The time t5, at which the print instruction is received in the head power-saving mode, is considered as the time the head power-saving mode ends. The time the print instruction is received in the head power-saving mode is considered as the time the printer power-saving mode ends, although not illustrated. FIG. 13 illustrates an execution sequence of the series of processes in step S14, step S16, step S20, step S22, step S24, step S26, step S8, step S10, step S12, and step S14 again, which are illustrated in FIGS. 10 and 11. In FIG. 13, the determination results in step S16 and step S26 are positive.

The controller 6 executes the reading operation and the head return operation in parallel from time t5. The execution period of the head return operation is 0.3 seconds, for example. In the example of FIG. 13, the head return operation is completed earlier than the reading operation, and the reading operation is completed at time t6. The controller 6 executes the cap release operation from time t6. The controller 6 executes the printing operation from time t7, which is later than time t6. In the example of FIG. 13, time t7 is earlier than time t4. However, time t7 can be later than time t4. The time the cap release operation starts may be later than time t6, at which the reading operation is completed, as long as being earlier than time t7, at which the printing operation is executed.

1-9. Summary of First Embodiment

As described above, the liquid ejecting apparatus 100 according to the first embodiment is a liquid ejecting apparatus that is able to execute the printing operation to eject ink from the nozzles N toward the medium PP. The liquid ejecting apparatus 100 is able to transition to the head power-saving mode in which less electric power is consumed per unit period than in the printing operation and the printer power-saving mode in which less electric power is consumed per unit period than in the head power-saving mode. The printer power-saving mode is started at the end of a predetermined period of time executed after completion of the printing operation. The head power-saving mode is started after the printing operation is completed and before the printer power-saving mode is started. The period of time taken for the liquid ejecting apparatus 100 to transition from the head power-saving mode to the printing operation is shorter than the period of time taken to transition from the printer power-saving mode to the printing operation.

When the printing operation is completed, the liquid ejecting apparatus 100 according to the first embodiment transitions to the head power-saving mode, from which the liquid ejecting apparatus 100 transitions to the printing operation more quickly than from the printer power-saving mode. When receiving a print instruction, therefore, the liquid ejecting apparatus 100 is able to start the printing operation more quickly than in an aspect where the liquid ejecting apparatus 100 transitions to the printer power-saving mode immediately after the printing operation. Furthermore, in the head power-saving mode, less electric power is consumed per unit period than in the printable mode. The liquid ejecting apparatus 100 according to the first embodiment therefore consumes less electric power than in the configuration where the printable mode continues even after the printing operation is completed. Thus, the liquid ejecting apparatus 100 according to the first embodiment is able to execute the printing operation immediately upon receiving the print instruction in the predetermined period of time following execution of the printing operation while consuming less electric power in the predetermined period of time following execution of the printing operation.

The liquid ejecting apparatus 100 includes the piezoelectric element 243, which can be driven to eject ink through the nozzle N; and the driving signal generation circuit 2 and driving circuit 242*a*, which generate the driving signal Com to drive the piezoelectric element 243 and also includes the memory unit 5, the controller 6, one or plural devices included in the maintenance mechanism 4, and the power supply switch, which are different from the driving signal generation circuit 2 and driving circuit 242*a*. In the head power-saving mode, the operations of the driving signal generation circuit 2 and driving circuit 242*a* are stopped, and in the printer power-saving mode, the operations of the driving signal generation circuit 2 and the driving circuit 242*a* are stopped as well as the operations of the memory unit 5, the controller 6, one or plural devices included in the maintenance mechanism 4, and the power supply switch.

The liquid ejecting apparatus 100 further includes the nozzle plate 280, which is provided with the nozzles N; and the cap 41 that can form the closed space CS by coming into contact with the ejection surface FN. To the closed space Cs, the nozzles N are opened. The surface FN includes the surface of the nozzle plate 280. After the printing operation is completed, the liquid ejecting apparatus 100 executes the capping operation to change the relative position of the cap 41 to the ejection surface FN such that the closed space CS is formed. The printer power-saving mode is started after the capping operation.

By performing the capping operation, the liquid ejecting apparatus 100 according to the first embodiment reduces an increase in viscosity of the ink within the nozzles N.

The liquid ejecting apparatus 100 starts the head power-saving mode at substantially the same time as when the capping operation is completed.

By performing the capping operation, the liquid ejecting apparatus 100 according to the first embodiment is able to reduce an increase in viscosity of the ink. Furthermore, the liquid ejecting apparatus 100 consumes less electric power than in the configuration where the head power-saving mode is started after the capping operation is completed.

The driving signal Com includes the micro-vibration waveform P2 driving the piezoelectric element 243 to vibrate ink within the nozzle N by a certain degree not ejecting the ink from the nozzle N. The liquid ejecting apparatus 100 supplies the micro-vibration waveform P2 to the piezoelectric element 243 during a period of time from when the printing operation is completed to when the capping operation is completed.

The liquid ejecting apparatus 100 according to the first embodiment supplies the micro-vibration waveform P2 to the piezoelectric element 243 to vibrate ink within the nozzle N, thus reducing an increase in ink viscosity within the nozzle N.

The liquid ejecting apparatus 100 according to the first embodiment further includes the controller 6 and the memory unit 5. When the liquid ejecting apparatus 100 transitioned to the head power-saving mode and is to execute the printing operation, the controller 6 executes the process to read from the memory unit 5, the state information indicating the state concerning the liquid ejecting apparatus 100 immediately before the liquid ejecting apparatus 100 transitioned to the head power-saving mode, in parallel to the head return operation as the process in step S10.

The liquid ejecting apparatus 100 according to the first embodiment takes a shorter period of time to transition from the head power-saving mode to the printing operation than in the configuration where the head return operation is executed after the process to read the state information from the memory unit 5.

The nozzle plate 280 is conductive and is coupled to the ground, and the surface of the nozzle plate 280 repels liquid. The piezoelectric element 243 includes the piezoelectric substance Qm and a pair of the electrodes Qd and Qu, which are provided so as to sandwich the piezoelectric substance Qm. The liquid ejecting apparatus 100 according to the first embodiment further includes: the selection circuit 245, which selects whether to supply the driving signal Com to the piezoelectric element 243; the vibration plate 260 including the conductive support plate 260*b*, to which the piezoelectric element 243 is fixed; and the pressure chamber substrate 270, which is provided between the nozzle plate 280 and the vibration plate 260 and is composed of a silicon monocrystal substrate.

As described above, when the driving signal Com is being supplied to the selection circuit 245, ripples contained in the driving signal Com flow to the piezoelectric element 243 even if the selection circuit 245 selects to not supply the driving signal Com to the piezoelectric element 243. Since the vibration plate 260, pressure chamber substrate 270, and nozzle plate 280 constitute a capacitor, current flows to the nozzle plate 280, which is coupled to the ground, resulting in deterioration of the liquid repellent film on the nozzle plate 280. In the first embodiment, the driving signal Com is not supplied to the selection circuit 245 during the head power-saving mode, reducing deterioration of the liquid repellent film of the nozzle plate 280.

2. Modification

The embodiment illustrated above can be variously modified. Specific modifications are illustrated below. Any two or more modifications selected from the following illustrations can be properly combined without conflicting each other.

2-1. First Modification

In the first embodiment, the head power-saving mode is started at substantially the same time as when the capping operation is completed. However, the head power-saving mode may be started before the capping operation is completed.

Figure 14:
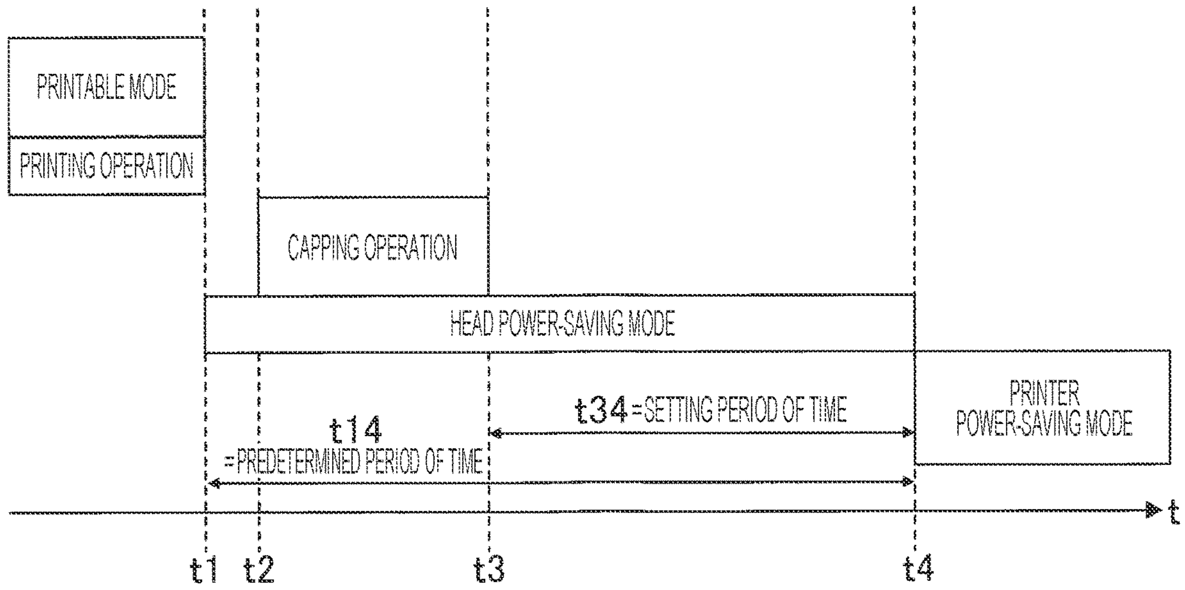
FIG. 14 is a diagram for explaining the execution sequence of a series of processes after completion of the printing operation in a first modification.

FIG. 14 is a diagram for explaining the execution sequence of a series of processes after completion of the printing operation in a first modification. FIG. 14 is a diagram corresponding to FIG. 12 in the first modification. The liquid ejecting apparatus 100 according to the first modification is different from the liquid ejecting apparatus 100 according to the first embodiment in not executing the out-of-printing micro-vibration operation and starting the head power-saving mode at time t1, at which the printing operation is completed.

Time t1 is earlier than time t3, at which the capping operation is completed. The liquid ejecting apparatus 100 according to the first modification thus starts the head power-saving mode before the capping operation is completed.

The liquid ejecting apparatus 100 according to the first modification transitions to the head power-saving mode before the capping operation is completed, thus implementing further reduction in power consumption.

The controller 6 of the first embodiment executes the two types of micro-vibration operation, including the in-printing micro-vibration operation and the out-of-printing micro-vibration operation. However, like the first modification, the controller 6 may be configured to execute only the in-printing micro-vibration operation and not execute the out-of-printing micro-vibration operation. Alternatively, the controller 6 may be configured to execute neither the out-of-printing micro-vibration operation nor the in-printing micro-vibration operation.

2-2. Second Modification

In the first modification, the head power-saving mode is started before the capping operation is completed. However, the head power-saving mode may be started after the capping operation is completed.

Figure 15:
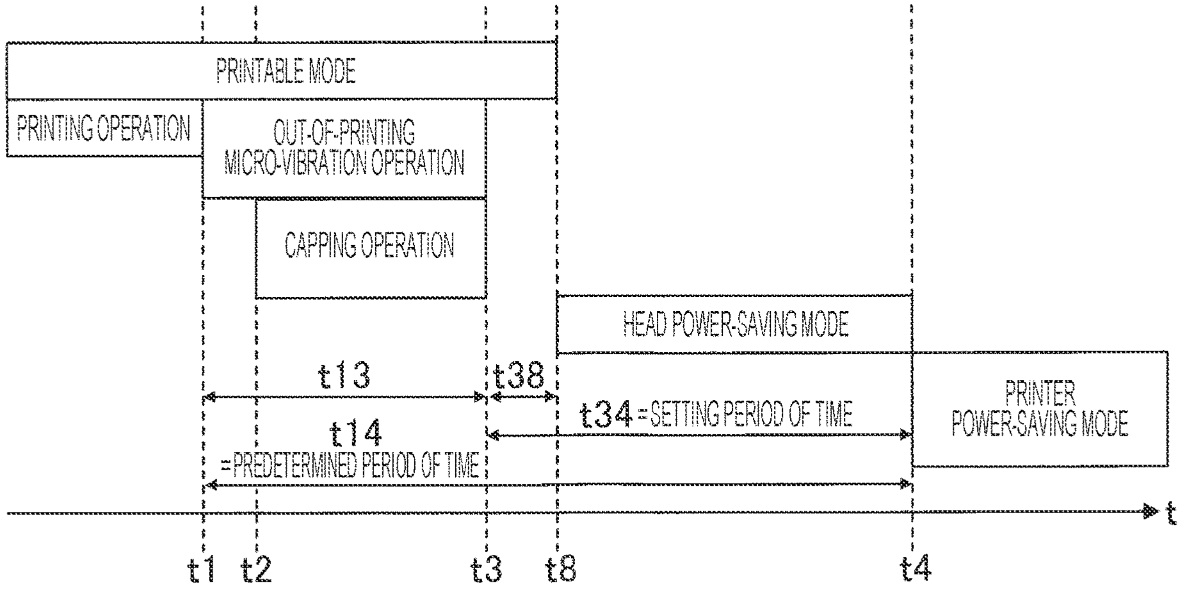
FIG. 15 is a diagram for explaining the execution sequence of a series of processes after completion of the printing operation in a second modification.

FIG. 15 is a diagram for explaining the execution sequence of a series of processes after completion of the printing operation in a second modification. FIG. 15 is a diagram corresponding to FIG. 12 in the second modification. The liquid ejecting apparatus 100 according to the second modification is different from the liquid ejecting apparatus 100 according to the first embodiment in starting the head power-saving mode at time t8, which is later than time t3. Herein, at time t3, the capping operation is completed. Time period t38 from time t3 to time t8 is longer than five seconds.

As illustrated in FIG. 15, time period t38 is a period of time the liquid ejecting apparatus 100 is in the printable mode but is performing neither the printing operation nor the out-of-printing micro-vibration operation. In such a period of time, the driving signal generation circuit 2 may be configured to output the driving signal Com as a constant DC voltage including neither the ejection waveform P1 nor the micro-vibration waveform P2. In this case, however, the driving signal output circuit 25 does not stop the switching operation during time period t38, and the driving signal Com generated during time period t38 contains ripples.

2-3. Third Modification

In the embodiment and modifications described above, in the head power-saving mode, the operations of the driving signal generation circuit 2 and driving circuit 242*a* are stopped. However, in the head power-saving mode, only the operation of the driving signal generation circuit 2 may be stopped and the operation of the driving circuit 242*a* may not be stopped. "In the head power-saving mode, the operation of the driving signal generation circuit 2 is stopped" in the third modification is an example of "in the first mode, operation of the one or plural circuits is stopped". Also in the third modification, the power consumption of the liquid ejecting apparatus 100 per unit period in the head power-saving mode is less than that in the printing operation, and the power consumption of the liquid ejecting apparatus 100 per unit period in the printer power-saving mode is less than that in the head power-saving mode.

2-4. Fourth Modification

In the embodiment and modifications described above, in the head power-saving mode, the operations of the driving signal generation circuit 2 and driving circuit 242*a* are stopped. However, in the head power-saving mode, only the driving circuit 242*a* may be stopped and the driving signal generation circuit 2 may not be stopped. "In the head power-saving mode, the operation of the driving circuit 242*a* is stopped" in the fourth modification is an example of "in the first mode, the operation of the one or plural circuits is stopped". Also in the fourth modification, the power consumption of the liquid ejecting apparatus 100 per unit period in the head power-saving mode is less than that in the printing operation, and the power consumption of the liquid ejecting apparatus 100 per unit period in the printer power-saving mode is less than that in the head power-saving mode. When the operation of the driving circuit 242*a* is stopped while the operation of the driving signal generation circuit 2 is not stopped like the fourth modification, ripples of the driving signal Com supplied to the driving circuit 242*a* are less likely to flow to the piezoelectric element 243 through the selection circuit 245 than in the case where the operation of the driving circuit 242*a* is not stopped.

2-5. Fifth Modification

In the embodiment and modifications described above, the liquid ejecting head 200 may be configured to include a heating element that heats ink within the pressure chamber 275 instead of the piezoelectric element 243. In the fifth modification, the heating element is an example of "a driving element". Even when the liquid ejecting head 200 includes the heating element, since the operation of the driving signal generation circuit 2 is stopped in the head power-saving mode, the liquid ejecting head 200 consumes less electric power than in the case where the printable mode continues after the printing operation is completed.

2-6. Sixth Modification

In the embodiment and modifications described above, the liquid ejecting head 200 may be configured to include the driving signal generation circuit 2.

2-7. Seventh Modification

In the embodiment and modifications described above, the predetermined period of time from when the printing operation is completed to when the printer power-saving mode is started may be configured to be optionally set by the user. For example, the execution period of the head power-saving mode may be set to the predetermined period of time minus the period of time from when the printing operation is completed to when the capping operation is completed.

2-8. Eighth Modification

In the embodiment and modifications described above, the out-of-printing micro-vibration operation following completion of the printing operation is performed until the capping operation is completed. However, the out-of-printing micro-vibration operation may be terminated at the time the capping operation starts. The time the capping operation starts may be the time the relative distance between the cap 41 and the ejection surface FN starts to change by the elevation mechanism 43 for the capping operation or may be the time the signal to displace the elevation mechanism 43 for the capping operation is transmitted from the controller 6 to the elevation mechanism 43. The time the capping operation starts may be different from the time the relative distance between the cap 41 and the ejection surface FN starts to change by the elevation mechanism 43 for the capping operation, but the difference therebetween is preferably not more than three seconds and is more preferably not more than one second. Even with such a configuration, it is possible to reduce an increase in ink viscosity within the nozzle N by supplying the micro-vibration waveform P2 to the piezoelectric element 243 to vibrate ink within the nozzle N.

2-9. Ninth Modification

The embodiment and modifications described above illustrate the serial-type liquid ejecting apparatus 100, which reciprocates the liquid ejecting head 200 along the X-axis. However, the present disclosure is not limited to such an embodiment. The liquid ejecting apparatus 100 may be a line-type liquid ejecting apparatus including plural nozzles N distributed over the entire width of the medium PP.

2-10. Other Modification

The aforementioned liquid ejecting apparatus can be employed for not only printing-dedicated devices but also various devices including facsimile apparatuses and copy apparatuses. The use of the liquid ejecting apparatus of the present disclosure is not limited to printing. For example, a liquid ejecting apparatus that ejects a solution of color material is used as a manufacturing apparatus to form a color filter for liquid crystal display apparatuses. A liquid ejecting apparatus that ejects a solution of conductive material is used as a manufacturing apparatus to form lines and electrodes of interconnection substrates.

3. Note

From the embodiment illustrated above, the following configurations are understood, for example.

The liquid ejecting apparatus according to Aspect 1 as a preferable aspect is a liquid ejecting apparatus configured to execute a printing operation to eject liquid from a nozzle toward a medium PP. The liquid ejecting apparatus is configured to transition to: a first mode in which less electric power is consumed per unit period than in the printing operation; and a second mode in which less electric power is consumed per unit period than in the first mode. The second mode is started at the end of a predetermined period of time following completion of the printing operation, and the first mode is started after the printing operation is completed and before the second mode is started. The period of time taken for the liquid ejecting apparatus to transition to the printing operation from the first mode is shorter than the period of time taken to transition to the printing operation from the second mode.

When the printing operation is completed, the liquid ejecting apparatus according to Aspect 1 transitions to the first mode, from which the liquid ejecting apparatus transitions to the printing operation more quickly than from the second mode. When receiving a print instruction, therefore, the liquid ejecting apparatus is able to start the printing operation more quickly than in the configuration where the liquid ejecting apparatus transitions to the second mode immediately after the printing operation. Furthermore, in the first mode, less electric power is consumed per unit period than in the printing operation. The liquid ejecting apparatus according to Aspect 1 consumes less electric power than in the configuration where the state allowing the printing operation continues even after the printing operation. Thus, in the predetermined period of time following execution of the printing operation, the liquid ejecting apparatus according to Aspect 1 is able to start the printing operation immediately upon receiving the print instruction while consuming less electric power.

In Aspect 2 as a specific example of Aspect 1, the liquid ejecting apparatus includes: a driving element configured to be driven to eject liquid from the nozzle; one or plural circuits including a driving signal generation circuit that generates a driving signal to drive the driving element; and a first circuit different from the one or plural circuits. In the first mode, operation of the one or plural circuits is stopped, and in the second mode, the operation of the one or plural circuits and operation of the first circuit are stopped.

In Aspect 3 as a specific example of Aspect 2, the liquid ejecting apparatus further includes: a nozzle plate provided with the nozzle; and a cap configured to form a closed space to which the nozzle is opened, by coming into contact with an ejection surface, the ejection surface including a surface of the nozzle plate. After the printing operation is completed, the liquid ejecting apparatus executes a capping operation to change the relative position of the cap to the ejection surface so as to form the closed space. The second mode is started after the capping operation.

By performing the capping operation, the liquid ejecting apparatus according to Aspect 3 suppresses an increase in viscosity of the liquid.

In Aspect 4 as a specific example of Aspect 3, the first mode is started at substantially the same time as when the capping operation is completed.

By performing the capping operation, the liquid ejecting apparatus according Aspect 4 is able to suppress an increase in viscosity of the liquid. Furthermore, the liquid ejecting apparatus according to Aspect 4 consumes less electric power than in the configuration where the first mode is started after the capping operation is completed.

In Aspect 5 as a specific example of Aspect 4, the driving signal includes a micro-vibration waveform driving the driving element so as to vibrate the liquid within the nozzle by a certain degree not ejecting the liquid from the nozzle. The micro-vibration waveform is supplied to the driving element during a period of time from when the printing operation is completed to when the capping operation is completed.

The liquid ejecting apparatus according to Aspect 5 supplies the micro-vibration waveform to the driving element to vibrate the ink within the nozzle, thus reducing an increase in viscosity of the liquid within the nozzle N.

In Aspect 6 as a specific example of Aspect 3, the first mode is started before the capping operation is completed.

The liquid ejecting apparatus according to Aspect 6 transitions to the first mode before the capping operation is completed, thus consuming less electric power than the liquid ejecting apparatus according to Aspect 1.

In Aspect 7 as a specific example of Aspect 1, the liquid ejecting apparatus further includes a controller and a memory unit. When the liquid ejecting apparatus transitioned to the first mode and is to execute the printing operation, in parallel to an operation to return from the first mode to the printing operation, the controller executes a process to read from the memory unit, state information indicating a state concerning the liquid ejecting apparatus immediately before the liquid ejecting apparatus transitioned to the first mode.

The liquid ejecting apparatus according to Aspect 7 takes a shorter period of time to transition from the first mode to the printing operation than in the configuration where the operation to return from the first mode is executed after the process to read the state information from the memory unit is executed.

In Aspect 8 as a specific example of Aspect 3, the nozzle plate is conductive and is coupled to ground, and the surface of the nozzle plate repels liquid. The driving element is a piezoelectric element including a piezoelectric substance and a pair of electrodes provided to sandwich the piezoelectric substance. The liquid ejecting apparatus further includes: a selection circuit selecting whether to supply the driving signal to the piezoelectric element; a vibration plate including a conductive support plate to which the piezoelectric element is fixed; and a pressure chamber substrate composed of a silicon monocrystal substrate provided between the nozzle plate and the vibration plate.

When the driving signal is being supplied to the selection circuit, ripples contained in the driving signal flow into the piezoelectric element even if the selection circuit selects to not supply the driving signal to the piezoelectric element. Since the vibration plate, pressure chamber substrate, and nozzle plate constitute a capacitor, current flows to the nozzle plate coupled to the ground, resulting in deterioration of the liquid repellency of the nozzle plate. In the liquid ejecting apparatus according to Aspect 8, the driving signal is not supplied to the selection circuit during the first mode, suppressing deterioration of the liquid repellency of the nozzle plate.

What is claimed is:

1. A liquid ejecting apparatus configured to execute a printing operation to eject liquid from a nozzle toward a medium, wherein the liquid ejecting apparatus is configured to transition to:

a first mode in which less electric power is consumed per unit period than in the printing operation; and a second mode in which less electric power is consumed per unit period than in the first mode, the second mode is started at an end of a predetermined period of time following completion of the printing operation, the first mode is started after the printing operation is completed and before the second mode is started, and a period of time taken for the liquid ejecting apparatus to return to the printing operation from termination of the first mode is shorter than a period of time taken for the liquid ejecting apparatus to return to the printing operation from termination of the second mode, wherein the liquid ejecting apparatus comprises:

a driving element configured to be driven to eject the liquid from the nozzle;

one or plural circuits including a driving signal generation circuit that generates a driving signal to drive the driving element; and a first circuit different from the one or plural circuits, wherein in the first mode, operation of the one or plural circuits is stopped, and in the second mode, the operation of the one or plural circuits and operation of the first circuit are stopped.

2. The liquid ejecting apparatus according to claim 1, further comprising:

a nozzle plate provided with the nozzle; and a cap configured to form a closed space to which the nozzle is opened by coming into contact with an ejection surface, the ejection surface including a surface of the nozzle plate, wherein after the printing operation is completed, the liquid ejecting apparatus executes a capping operation to change a relative position of the cap to the ejection surface so as to form the closed space, and the second mode is started after the capping operation.

3. The liquid ejecting apparatus according to claim 2, wherein the first mode is started at substantially same time as when the capping operation is completed.

4. The liquid ejecting apparatus according to claim 3, wherein the driving signal includes a micro-vibration waveform driving the driving element so as to vibrate the liquid within the nozzle by a certain degree not ejecting the liquid from the nozzle, and the micro-vibration waveform is supplied to the driving element during a period of time from when the printing operation is completed to when the capping operation is completed.

5. The liquid ejecting apparatus according to claim 2, wherein the first mode is started before the capping operation is completed.

6. The liquid ejecting apparatus according to claim 2, wherein the nozzle plate is conductive and is coupled to ground, the surface of the nozzle plate repels the liquid, and the driving element is a piezoelectric element including a piezoelectric substance and a pair of electrodes provided to sandwich the piezoelectric substance, the liquid ejecting apparatus further comprising:

a selection circuit selecting whether to supply the driving signal to the piezoelectric element;

a vibration plate including a conductive support plate to which the piezoelectric element is fixed; and a pressure chamber substrate composed of a silicon monocrystal substrate provided between the nozzle plate and the vibration plate.

7. The liquid ejecting apparatus according to claim 1, comprising:

a controller; and a memory unit, wherein when the liquid ejecting apparatus transitioned to the first mode and is to execute the printing operation, in parallel to an operation to return to a printable mode from the first mode, the controller executes a process to read from the memory unit, state information indicating a state concerning the liquid ejecting apparatus immediately before the liquid ejecting apparatus transitioned to the first mode.

* * * * *